(12) United States Patent
Yukawa

(10) Patent No.: US 7,197,088 B1
(45) Date of Patent: Mar. 27, 2007

(54) DIGITAL BROADCAST RECEIVING SYSTEM

(75) Inventor: Maki Yukawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 819 days.

(21) Appl. No.: 09/679,623

(22) Filed: Oct. 5, 2000

(30) Foreign Application Priority Data

May 19, 2000 (JP) .............................. 2000-148098

(51) Int. Cl.
*H03K 9/00* (2006.01)
(52) U.S. Cl. ........................................ 375/316; 386/46
(58) Field of Classification Search ................ 375/316;
725/68, 70–71, 89, 135, 141, 142, 151, 153;
348/569, 500, 501, 521; 455/3.02; 386/46, 386/98
See application file for complete search history.

(56) References Cited

U.S. PATENT DOCUMENTS

| | | | | |
|---|---|---|---|---|
| 4,230,990 A * | 10/1980 | Lert et al. | ...................... | 725/22 |
| 5,859,660 A * | 1/1999 | Perkins et al. | ................ | 725/32 |
| 5,899,578 A * | 5/1999 | Yanagihara et al. | .......... | 386/75 |
| 5,991,832 A * | 11/1999 | Sato et al. | ..................... | 710/33 |
| 6,353,930 B1 * | 3/2002 | Shimoji et al. | ............. | 725/110 |
| 6,477,204 B1 * | 11/2002 | Fukushima et al. | .... | 375/240.28 |
| 6,504,826 B1 * | 1/2003 | Kato et al. | .................. | 370/312 |
| 6,516,376 B1 * | 2/2003 | Christine et al. | ........... | 710/305 |
| 6,557,171 B1 * | 4/2003 | Sonoda et al. | .............. | 725/136 |
| 6,604,215 B1 * | 8/2003 | Chiba | ......................... | 714/751 |
| 6,643,449 B1 * | 11/2003 | Nagata et al. | ................ | 386/46 |
| 6,986,159 B1 * | 1/2006 | Shimoji et al. | ............. | 725/142 |
| 7,024,100 B1 * | 4/2006 | Furuyama | .................... | 386/98 |

FOREIGN PATENT DOCUMENTS

JP A9247603 9/1997

* cited by examiner

*Primary Examiner*—Khanh Tran
(74) *Attorney, Agent, or Firm*—Birch, Stewart, Kolasch & Birch, LLP

(57) ABSTRACT

A second is counted at a step S11, and an information table is read at a step S12. Content change of the information table is checked at a step S13. The content change is checked by checking the value of a CRC or checking content change of at least one of values of PIDs of an image, a sound and a PCR, stream types and descriptors, information necessary for operations of a receiver. When the contents of the information table are determined as changed by the aforementioned checking method (YES at the step S13), a determination is made that change of a program is detected at a step S14 and a program parameter described in the information table is set as a signal extraction parameter of a demultiplexer at a step S15, for executing channel changing validating the signal extraction parameter set in the demultiplexer at a step S16. Thus obtained is a digital broadcast receiving system capable of executing receiving in program change with no hindrance through a receiver having a relatively simple structure.

12 Claims, 17 Drawing Sheets

F/G. 17
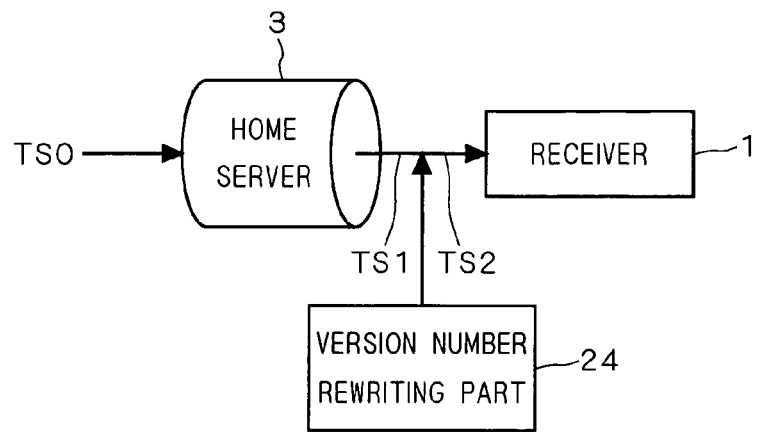
F/G. 18
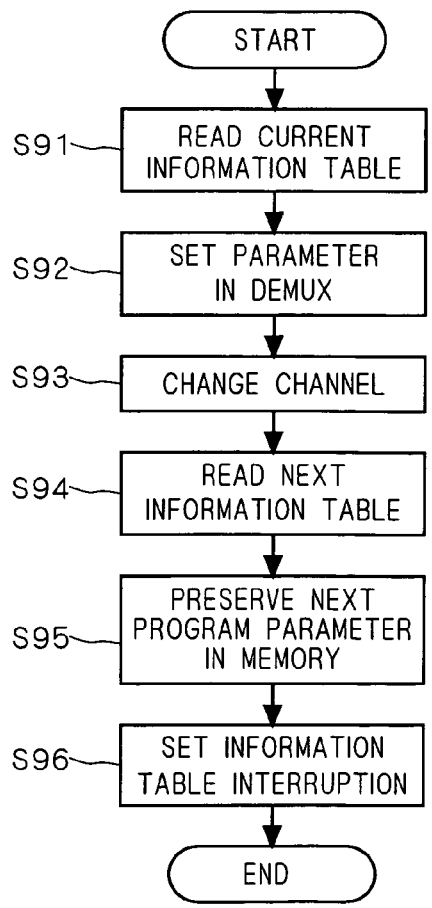

DIGITAL BROADCAST RECEIVING SYSTEM

BACKGROUND OF THE INVENTION

1. Field of the Invention

The present invention relates to a digital broadcast receiving system, and more particularly, it relates to a program change detecting function thereof.

2. Description of the Background Art

FIG. 22 is a block diagram showing the structure of a receiver of a conventional digital broadcast receiving system, and FIG. 23 is a block diagram showing the structure of a recording/reproducing apparatus of the conventional digital broadcast receiving system. The conventional digital broadcast receiving system shown in FIGS. 22 and 23 is based on a system disclosed in Japanese Patent Application Laid-Open No. 9-247603 (1997). As shown in FIGS. 22 and 23, the digital broadcast receiving system includes a receiver 100 and a recording/reproducing apparatus 2, while a monitor 104 is connected to the receiver 100.

As shown in FIG. 22, the receiver 100 has a receiving/demodulating part 111, a packet filter 112, a controller 123, an information table extractor 114, a program selection/acquisition information part 115, a system clock generator 116, a changeover switch 117, a demultiplexer 118, a decoder 119, a digital interface 122, an information table rewriter 124 rewriting an information table obtained from the packet filter 112, a discontinuity information generator 125 detecting that a demodulated signal obtained from the receiving/demodulating part 111 is discontinuous and generating discontinuity information and a recording/reproducing information table generator 126 generating a recording/reproducing information table described later.

On the other hand, the recording/reproducing apparatus 2 has a digital interface 131, an information table extractor 132, a system clock generator 133, a deck part 135 and a buffer 136 as shown in FIG. 23, and additionally has a PCR rewriter 137 rewriting a PCR (program clock reference), a discontinuity information rewriter 138 rewriting the discontinuity information, a discontinuity information detector 139 detecting the discontinuity information, a controller 140 and a display 141 displaying its operating state.

When receiving a digital television signal from the digital interface 131, the recording/reproducing apparatus 2 extracts the recording/reproducing information table by the information table extractor 132. The controller 140 extracts a plurality of information related to programs from the extracted recording/reproducing information table.

The system clock generator 133 generates a system clock 27 MHz of the recording/reproducing apparatus 2 with reference to a PCR included in a transport packet of MPEG2. The discontinuity information detector 139 monitors whether or not an information table of the digital television signal includes discontinuity information, for immediately posting the information table extractor 132, the system clock generator 133 and the controller 140 when the information table includes discontinuity information and reloading the PCR, PAT and a PMT (program map table) thereby minimizing failure resulting from clock discontinuity.

The controller 140 sets a recording bit rate of the recording/reproducing apparatus 2 from information in the information table, performs operations such as error correction and modulation by the deck part 35 and records the recording bit rate in a recording medium.

When the information table includes no information related to bit rate extraction and the recording bit rate cannot be set, the controller 140 sets a mode to a maximum recording bit rate of the recording/reproducing apparatus 2 and records the same. At this time, the controller 140 monitors an occupied quantity of the buffer 136 for posting a user when the rate of a received signal is greater than the recording rate and overflows the buffer 136.

In reproduction, the recording/reproducing apparatus 2 demodulates a reproduced signal from the recording medium by the deck part 135, performs an operation such as error correction and outputs the signal to the digital interface 131. When changing an operation mode from general reproduction to high-speed reproduction or performing rewinding or slow reproduction, the PCR rewriter 137 rewrites the PCR to a correct value while the discontinuity information rewriter 138 adds information indicating discontinuity to the recording/reproducing information table.

The conventional digital broadcast receiving system having the aforementioned structure stores information necessary for recording/reproduction in the recording/reproducing information table as to a program for recording a digital television signal. The information necessary for recording/reproduction includes information indicating the bit rate of the program of the recorded digital broadcast signal, the broadcast starting date, the time length of the broadcast, the title of the program, the broadcasting channel and the type of each stream of the digital broadcast signal. Such an information table is multiplexed on the digital television signal in a predetermined table form, thereby simplifying extraction and acquisition of information in subsequent processing.

In the aforementioned conventional digital broadcast receiving system, system construction of the receiver is disadvantageously complicated since a large number of types of information must be rewritten for changing the program. When detecting program change depending on change of a version number of the information table, it is impossible to cope with such a case that no special order is observed in version numbers of the information table.

SUMMARY OF THE INVENTION

A digital broadcast receiving system according to a first aspect of the present invention has a receiver receiving a digital broadcast signal including an information table describing a program parameter forming a program, while the receiver comprises parameter set means for setting the program parameter described in the information table included in the digital broadcast signal as a signal extraction parameter; and signal extraction means for extracting a program signal from the digital broadcast signal on the basis of the signal extraction parameter, and the parameter set means detects content change of the information table on the basis of a predetermined criterion and sets the program parameter described in the information table after the content change as the signal extraction parameter every detection of the content change.

As described above, the parameter set means of the digital broadcast receiving system according to the first aspect sets the program parameter described in the information table after content change every detection of the content change of the information table, whereby receiving can be quickly performed in program with no hindrance through content change of the information table.

The parameter set means may have a structure capable of detecting content change of the information table, whereby the receiver can be implemented with a relatively simple structure.

According to a second aspect of the present invention, the parameter set means monitors the contents of the information table every predetermined time, while the predetermined criterion includes presence/absence of content change of the information table itself.

The digital broadcast receiving system according to the second aspect can quickly detect program change by detecting content change of the information table itself every predetermined time.

According to a third aspect of the present invention, the information table further describes a PCR (program clock reference) serving as time information, and the parameter set means monitors discontinuity of the PCR while the predetermined criterion includes presence/absence of discontinuity of the PCR.

The digital broadcast receiving system according to the third aspect can detect content change of the information table with a relatively simple criterion on presence/absence of discontinuity of the PCR.

According to a fourth aspect of the present invention, the information table further describes a PCR serving as timing information, and the parameter set means monitors the received state of the PCR while the predetermined criterion includes whether or not the PCR is unreceivable for a predetermined time.

The digital broadcast receiving system according to the fourth aspect can detect content change of the information table by relatively simple recognition on the fact that the PCR is unreceivable for a predetermined time.

According to a fifth aspect of the present invention, the receiver further comprises decoding means decoding the program signal, and the parameter set means monitors a result of decoding by the decoding means while the predetermined criterion includes presence/absence of error occurrence in the result of decoding.

The digital broadcast receiving system according to the fifth aspect can detect content change of the information table with a relatively simple criterion on presence/absence of error occurrence in a decoding result.

According to a sixth aspect of the present invention, the digital broadcast signal includes an EPG (electric program guide) describing a schedule for a broadcasted program, and the parameter set means previously recognizes an end time of a currently received program from the EPG while the predetermined criterion includes whether or not reaching the end time of the program.

The digital broadcast receiving system according to the sixth aspect can detect content change of the information table without regularly monitoring the digital broadcast signal by previously recognizing the end time of the current program from the EPG.

According to a seventh aspect of the present invention, the digital broadcast signal includes an externally received digital broadcast signal directly received from outside.

The digital broadcast receiving system according to the seventh aspect can detect content change of the information table without manipulating the externally received digital broadcast signal directly received from outside.

According to an eighth aspect of the present invention, the digital broadcast receiving system further comprises recording/reproducing means having a recording/reproducing part receiving an externally received digital broadcast signal from outside for recording the externally received digital broadcast signal while outputting the recorded signal as a digital broadcast signal for reproduction, the digital broadcast signal includes the digital broadcast signal for reproduction, the receiver further comprises storage means, and the parameter set means extracts a next program information table serving as an information table for a next program subsequent to a current program currently received by the receiver from the digital broadcast signal for reproduction recorded in the recording/reproducing part, previously preserves a program parameter described in the next program information table as a next program parameter, and reads the next program parameter from the storage means to set the next program parameter as the signal extraction parameter when the contents of the information table change.

The digital broadcast receiving system according to the eighth aspect can set the signal extraction parameter at a high speed by setting the next program parameter read/obtained from the storage means as the signal extraction parameter.

According to a ninth aspect of the present invention, the digital broadcast receiving system further comprises recording/reproducing means having a recording/reproducing part receiving an externally received digital broadcast signal from outside for recording the externally received digital broadcast signal while outputting the recorded signal as a digital broadcast signal for reproduction, the digital broadcast signal includes the digital broadcast signal for reproduction, the recording/reproducing means further comprises a discontinuity flag adding part for adding a discontinuity flag to the externally received digital broadcast signal when the recording/reproducing part stops recording the externally received digital broadcast signal and making the recording/reproducing part record the externally received digital broadcast signal to which the discontinuity flag is added as the digital broadcast signal for reproduction, and the parameter set means monitors the discontinuity flag in the digital broadcast signal for reproduction while the predetermined criterion includes presence/absence of the discontinuity flag.

The digital broadcast receiving system according to the ninth aspect can recognize change of the contents of the information table with relatively simple processing of detecting presence/absence of a discontinuity flag added when the recording/reproducing part stops recording from the digital broadcast signal for reproduction.

According to a tenth aspect of the present invention, the digital broadcast receiving system further comprises recording/reproducing means having a recording/reproducing part receiving an externally received digital broadcast signal from outside for recording the externally received digital broadcast signal while outputting the recorded signal as a digital broadcast signal for reproduction, the digital broadcast signal includes the digital broadcast signal for reproduction, the recording/reproducing means further comprises a discontinuity flag adding part adding a discontinuity flag to the digital broadcast signal for reproduction when the recording/reproducing part shifts from a reproducing state for the digital broadcast signal for reproduction to a stop state, and the parameter set means monitors the discontinuity flag in the digital broadcast signal for reproduction while the predetermined criterion includes presence/absence of the discontinuity flag.

The digital broadcast receiving system according to the tenth aspect can recognize change of the contents of the information table with relatively simple processing of detecting presence/absence of a discontinuity flag added when the recording/reproducing part shifts from a reproducing state to a stop state from the digital broadcast signal for reproduction.

According to an eleventh aspect of the present invention, the digital broadcast receiving system further comprises recording/reproducing means having a recording/reproducing part receiving an externally received digital broadcast signal from outside for recording the externally received digital broadcast signal while outputting the recorded signal as a digital broadcast signal for reproduction, the digital broadcast signal includes the digital broadcast signal for reproduction, the recording/reproducing means further comprises identification code adding means for adding an identification code identifiable in a program unit to an information table in the externally received digital broadcast signal when the recording/reproducing part records the externally received digital signal and making the recording/reproducing part record the externally received digital broadcast signal to which the identification code is added as the digital broadcast signal for reproduction, and the parameter set means monitors the identification code added to the information table in the digital broadcast signal for reproduction while the predetermined criterion includes presence/absence of change of the identification code.

The digital broadcast receiving system according to the eleventh aspect can recognize change of the contents of the information table with relatively simple processing of detecting change of an identification code identifiable in a program unit added to the information table.

According to a twelfth aspect of the present invention, the digital broadcast receiving system further comprises recording/reproducing means having a recording/reproducing part receiving an externally received digital broadcast signal from outside for recording the externally received digital broadcast signal while outputting the recorded signal as a digital broadcast signal for reproduction, the digital broadcast signal includes the digital broadcast signal for reproduction, the recording/reproducing means further comprises identification code adding means adding a new identification code to an information table in the digital broadcast signal for reproduction every time the recording/reproducing part shifts from a reproducing state for the digital broadcast signal for reproduction to a stop state, and the parameter set means monitors the identification code added to the information table in the digital broadcast signal for reproduction while the predetermined criterion includes presence/absence of change of the identification code.

The digital broadcast receiving system according to the twelfth aspect can recognize change of the contents of the information table with relatively simple processing of detecting change of an identification code of the information table changed when the recording/reproducing part shifts from a reproducing state to a stop state.

According to a thirteenth aspect of the present invention, the information table includes a current program information table corresponding to a currently broadcasted program and a next program information table corresponding to a program broadcasted next, and wherein the parameter set means previously performs temporary set processing extracting the next program information table from the digital broadcast signal and temporarily setting a program parameter described in the next program information table as a next program parameter, monitors the contents of the current program information table while the predetermined criterion includes whether or not the contents of the current program information table change to the contents of the next program information table, and performs real set processing setting the temporarily set next program parameter as the signal extraction parameter when the contents of the information table change.

The digital broadcast receiving system according to the thirteenth aspect, performing real set processing for setting a previously temporarily set next program parameter as a current signal extraction parameter when the contents of the information table change, can set the signal extraction parameter at a high speed.

According to a fourteenth aspect of the present invention, the receiver includes storage means, the temporary set processing includes processing of making the storage means store the next program parameter, and the real set processing includes processing of reading the next program parameter from the storage means and setting the next program parameter as a signal extraction parameter.

The digital broadcast receiving system according to the fourteenth aspect sets the signal extraction parameter at a high speed by executing processing of reading the next program parameter from the storage means and setting the same to the signal extraction parameter as real set processing.

According to a fifteenth aspect of the present invention, the signal extraction means extracts a program signal from the digital broadcast signal on the basis of a valid signal extraction parameter, the temporary setting includes processing of temporarily setting the next program parameter without validating the same as the signal extraction parameter, and the real set processing includes processing of validating the signal extraction parameter.

The digital broadcast receiving system according to the fifteenth aspect sets the signal extraction parameter at a high speed by executing processing of validating the signal extraction parameter as real set processing.

An object of the present invention is to obtain a digital broadcast receiving system capable of executing receiving in program change with no hindrance through a receiver having a relatively simple structure.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 17 is an explanatory diagram for illustrating a version number rewriting operation in a digital broadcast receiving system according to an embodiment 10 of the present invention;

FIG. 18 is a flow chart showing an initial operation of a first program change detecting operation in a digital broadcast receiving system according to an embodiment 11 of the present invention;

DESCRIPTION OF THE PREFERRED EMBODIMENTS

Embodiment 1

Figure 1:
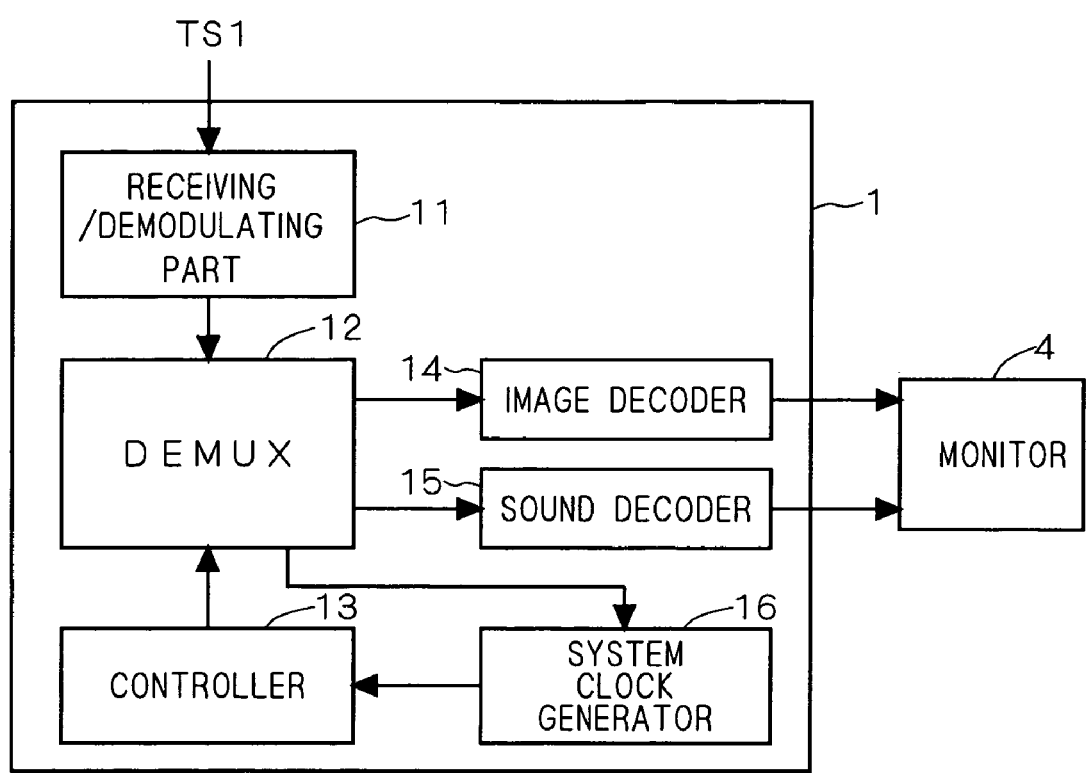
FIG. 1 is a block diagram showing the internal structure of a digital broadcast receiving system according to an embodiment 1 of the present invention.

FIG. 1 is a block diagram showing the internal structure of a digital broadcast receiving system according to an embodiment 1 of the present invention. As shown in FIG. 1, the digital broadcast receiving system is formed by a receiver 1 and a monitor 4. FIG. 1 shows parts transferring data with arrows, while omitting transfer of control signals such as an interruption signal.

A transport stream TS1 formed by a digital broadcast signal is input in a receiving/demodulating part 11 in the receiver 1. The transport stream TS1 may conceivably be a signal (externally received digital broadcast signal) directly received from outside or a reproduced signal (digital broadcast signal for reproduction) received from a home server described later.

The receiving/demodulating part 11 demodulates the received transport stream TS1 and outputs a packet stream. The packet stream includes a packet (hereinafter referred to also as "data transmission packet") for transmitting image data, sound data etc. of a program and a packet (hereinafter referred to also as "information table transmission packet") for transmitting an information table describing a program parameter forming the program. The term "information table" described in this specification mainly indicates a PMT (program map table).

When a user specifies a specific program, a controller 13 serves as parameter set means for setting the program parameter described in the information table in a DEMUX (demultiplexer) 12 as a signal extraction parameter thereby instructing packet selection contents to the DEMUX 12. The program parameter is data including a PID (packet identifier) for dismantling a packet form and obtaining image data, sound data, a PCR and the like.

On the basis of the signal extraction parameter, the DEMUX 12 dismantles the packet form in the packet stream for extracting a bit stream of the image data and outputting the same to an image decoder 14 while extracting a bit stream of the sound data and outputting the same to a sound decoder 15 and extracting a bit stream of the PCR and outputting the same to a system clock generator 16. These bit streams of the image data, the sound data and the PCR correspond to program signals.

The image decoder 14 and the sound decoder 15 decode the bit streams from the DEMUX 12 and output the same to the monitor 4. The monitor 4 displays the image and the sound on the basis of the output signals from the image decoder 14 and the sound decoder 15 respectively.

The system clock generator 16 refers to a clock restoration reference signal, referred to as a PCR, obtained from the DEMUX 12 and generates a system clock of the receiver 1.

Figure 2:
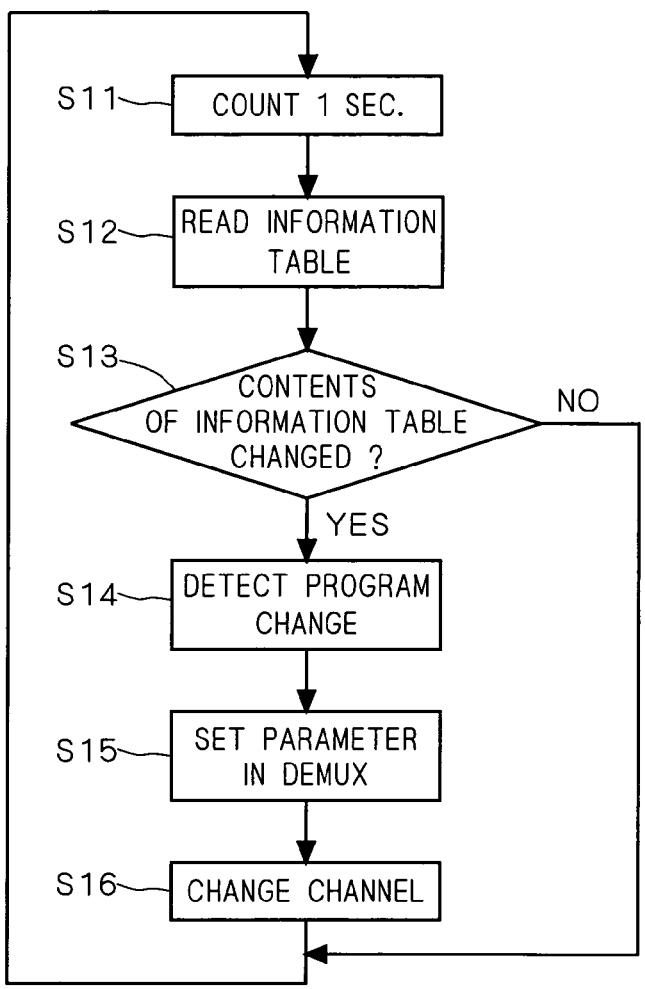
FIG. 2 is a flow chart showing a program change detecting operation in the digital broadcast receiving system according to the embodiment 1 of the present invention.

FIG. 2 is a flow chart showing a program change detecting operation in the digital broadcast receiving system according to the embodiment 1 of the present invention. This operation is performed mainly on the DEMUX 12 under control of the controller 13.

Referring to FIG. 2, a second is counted with the system clock obtained from the system clock generator 16 at a step S11, and the information table is read from the information table transmission packet of the packet stream demodulated every second at a step S12. Thus, it is possible to detect content change of the information table, i.e., program change timing with precision within one second by reading the information table from the packet stream every second.

Then, content change of the information table is checked at a step S13. The content change is checked by checking a CRC (cyclic redundancy check) value or checking content change of at least one of values of PIDs (packet identifiers) of the image, the sound and the PCR (program clock reference), stream types and descriptors, information necessary for operations of the receiver 1. Such a checking function can be implemented with a relatively simple structure.

When change of the contents of the information table is detected in the aforementioned checking (YES at the step S13), a determination is made on detection of program change at a step S14, and the program parameter described in the information table is set as a signal extraction parameter of the DEMUX 12 at a step S15.

Channel changing validating the signal extraction parameter set in the DEMUX 12 is executed at a step S16, and thereafter the process returns to the step S11.

When the information table remains unchanged (NO at the step S13), the process immediately returns to the step S11 without carrying out the steps S14 to S16. Thereafter the processing through the steps S11 to S16 is repeated thereby quickly performing the program change detecting operation.

Thus, the digital broadcast receiving system according to the embodiment 1 employs the receiver 1 of a relatively simple structure as shown in FIG. 1 for quickly setting the signal extraction parameter of the DEMUX 12 in program change, thereby performing a receiving operation with no hindrance.

Embodiment 2

A digital broadcast receiving system according to an embodiment 2 of the present invention utilizes discontinuity of the value of a PCR for detecting program change. The PCR is time information, and hence a determination on program change is made when the value of the PCR deviates from the value of an STC (system time clock: reference synchronous signal) for newly rereading an information table.

Figure 3:
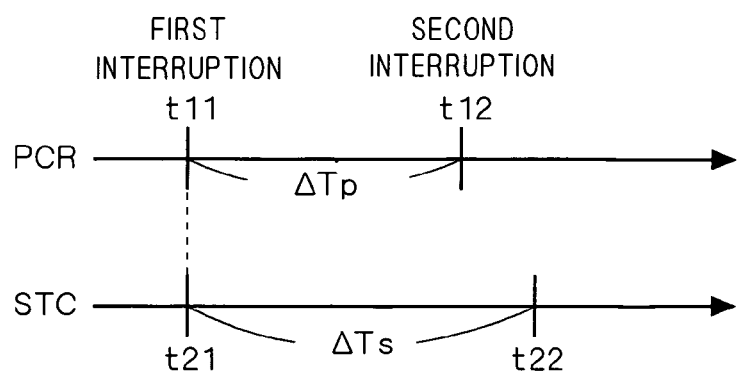
FIG. 3 is an explanatory diagram for illustrating the principle of an embodiment 2 of the present invention.

FIG. 3 is an explanatory diagram for illustrating the principle of the embodiment 2 of the present invention. As shown in FIG. 3, an STC time t21 in first PCR receiving interruption and a PCR instruction time t11 are set to reference times for an STC and a PCR respectively. For example, the STC time t21 is set to the PCR instruction time t11 in first PCR receiving interruption.

The time difference ΔTs between an STC time t22 in second PCR receiving interruption and the STC time t21 is compared with the time difference ΔTp between a PCR instruction time t12 and the PCR instruction time t11.

When the absolute value of the deviation between the time differences ΔTs and ΔTp is not more than 0.1 sec., the PCR can be regarded as continuous. When the absolute value of the deviation between the time differences ΔTs and ΔTp is in excess of 0.1 sec., however, the PCR is regarded as discontinuous for determining that the contents of the information table have changed for changing the program. When detecting program change with the relatively simple criterion of discontinuity of the PCR, the next program can be received with no hindrance and normally reproduced on a monitor 4 by newly reading the information table and setting a program parameter described in the information table in a demultiplexer.

Figure 4:
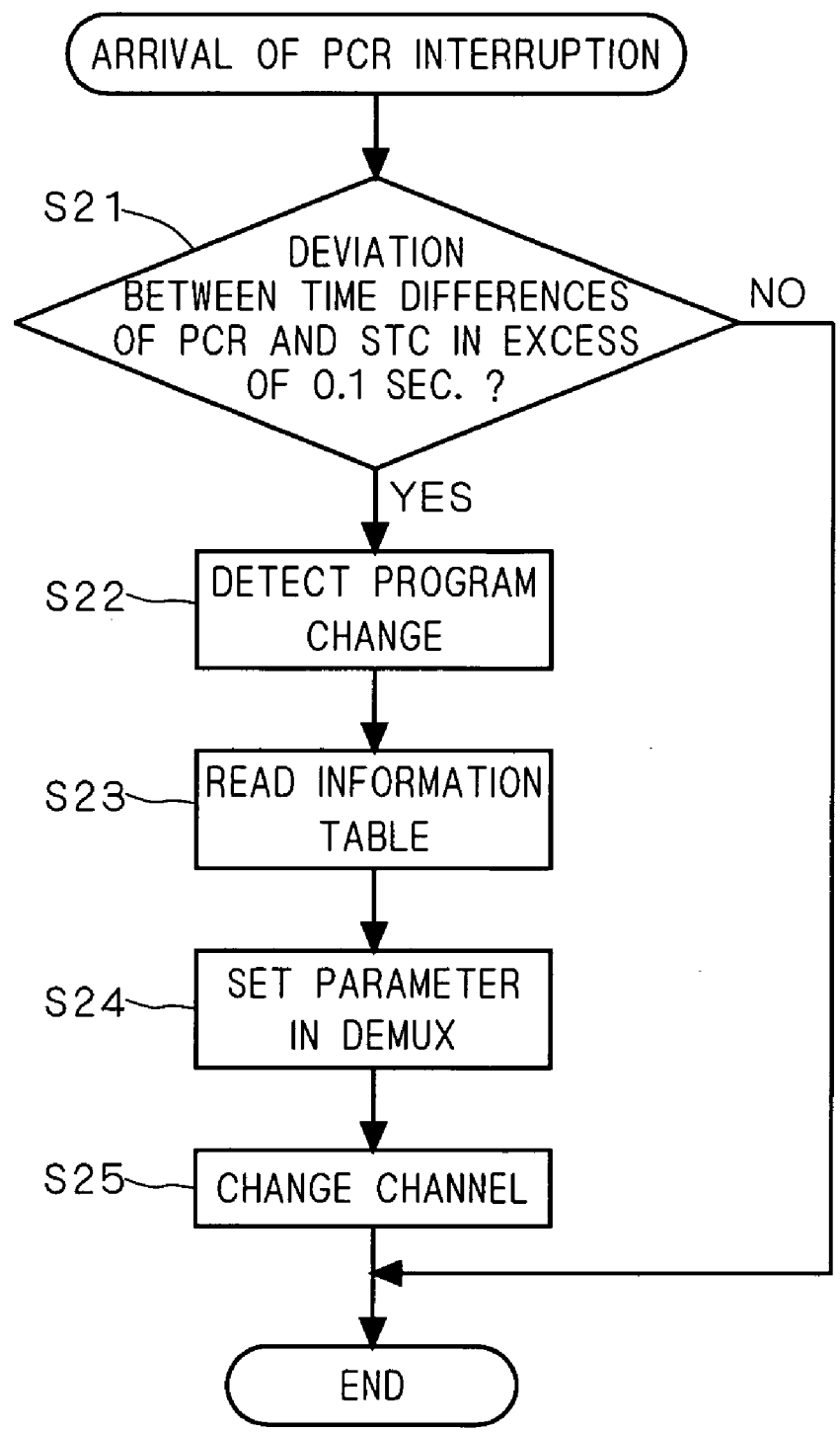
FIG. 4 is a flow chart showing PCR interruption processing in a digital broadcast receiving system according to the embodiment 2.

FIG. 4 is a flow chart showing PCR interruption processing in the digital broadcast receiving system according to the embodiment 2. This operation is performed mainly on a DEMUX 12 under control of a controller 13, similarly to the embodiment 1. The system structure of the embodiment 2 is similar to that of the embodiment 1.

When PCR receiving interruption arrives, time differences between PCRs and STCs are compared with each other for calculating deviation between the time differences at a step S21, as shown in FIG. 3. The processing is ended when the deviation between the time differences is within 0.1 sec. (NO at the step S21), while the process advances to a step S22 if the deviation is in excess of 1 sec. (YES at the step S21). The determination at the step S21 can be relatively simply made.

Detection of program change is determined at the step S22, a new information table is read at a step S23, a program parameter described in the read information table is set as a signal extraction parameter of the DEMUX 12 at a step S24, and channel changing is performed at a step S25 for ending the interruption processing.

Thus, the digital broadcast receiving system according to the embodiment 2 can perform a receiving operation in program change with no hindrance through a receiver of a relatively simple structure, similarly to the embodiment 1.

Embodiment 3

An embodiment 3 of the present invention detects program change by non-arrival of a PCR over a constant time. When the PCR does not arrive due to change of its PID, no PCR interruption takes place and hence program change cannot be detected by the aforementioned comparison with an STC value. Therefore, a counter value for counting a continuation time of non-arrival of the PCR is added for setting a counter to "0" when PCR interruption takes place. A determination on program change is made when the counter value is more than or equal to a predetermined value, for rereading an information table. It is possible to relatively readily recognize that the continuation of non-arrival of the PCR exceeds a predetermined time.

Figure 5:
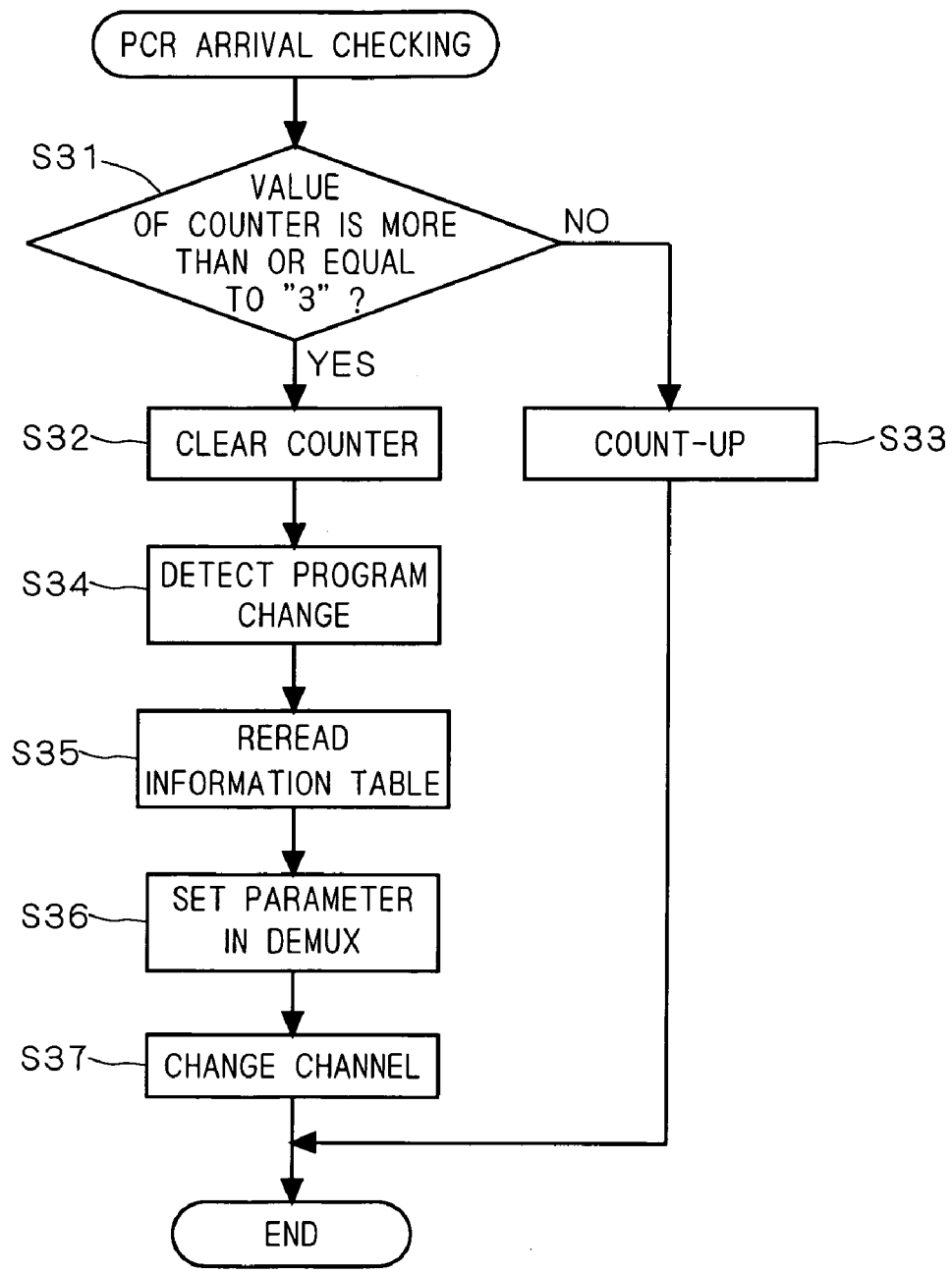
FIG. 5 is a flow chart showing a program change detecting operation in a digital broadcast receiving system according to an embodiment 3 of the present invention.

FIG. 5 is a flow chart showing a program change detecting operation based on PCR arrival check processing by a digital broadcast receiving system according to the embodiment 3 of the present invention. This operation is performed mainly on a DEMUX 12 under control of a controller 13, similarly to the embodiment 1. The system structure of the embodiment 3 is similar to that of the embodiment 1.

The PCR arrival check processing is executed every second on the basis of a system clock generated in a system clock generator 16. In the PCR arrival check processing, a counter for counting a PCR non-arrival continuation time is set. The counter can be implemented by a function previously provided on the controller 13.

Referring to FIG. 5, whether or not the value of the aforementioned counter is at least "3" (predetermined value) is checked at a step S31 for advancing to a step S32 if the counter value is at least 3 (YES) while counting up the counter at a step S33 for ending the processing if the value is less than 3 (NO).

The counter is cleared at the step S32. At this time, it follows that PCR receiving interruption does not occur for at least 3 seconds (since the counter is reset to "0" upon occurrence of PCR receiving interruption), for determining that the program is changed at a step S34 since the PCR does not flow in the current PID, rereading an information table at a subsequent step S35, setting a program parameter described in the reread information table as a signal extraction parameter of the DEMUX 12 at a step S36 and executing channel changing at a step S37 so that the changed program can be reproduced on a monitor 4 with no hindrance.

Thus, the digital broadcast receiving system according to the embodiment 3 can perform a receiving operation in program change with no hindrance through a receiver of a relatively simple structure similarly to the embodiment 1.

Embodiment 4

An embodiment 4 of the present invention regards that a program changes when a decoder chip (an image decoder 14 or a sound decoder 15) causes an error such as an image format error, a bit rate change error, a buffer overflow, a buffer underflow or image freezing while the image decoder 14 and the sound decoder 15 normally perform decoding.

Figure 6:
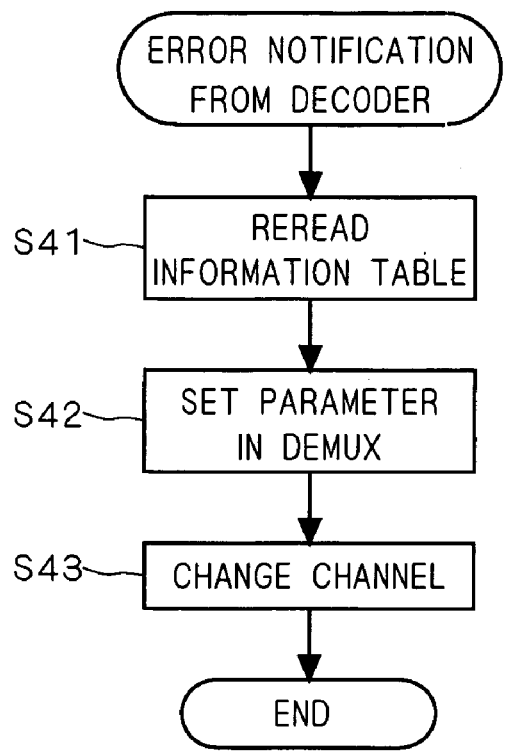
FIG. 6 is a flow chart showing a program change detecting operation in a digital broadcast receiving system according to an embodiment 4 of the present invention.

FIG. 6 is a flow chart showing a program change detecting operation based on error notification of a decoding result of a decoder monitored by a digital broadcast receiving system according to an embodiment 4 of the present invention. This operation is mainly performed on a DEMUX 12 under control of a controller 13, similarly to the embodiment 1. The system structure of the embodiment 4 is similar to that of the embodiment 1 except that the controller 13 is capable of recognizing error notification from the image decoder 14 or the sound decoder 15.

Such a structure that the controller 13 can recognize error notification from the image decoder 14 or the sound decoder 15 can be relatively readily implemented by the controller 13 by periodically monitoring status information indicating presence/absence of error notification from the image decoder 14 or the sound decoder 14, issuing interruption upon error notification or the like.

When receiving error notification from either decoder 14 or 15, the controller 13 determines that program change has been made, rereads an information table at a step S41, sets a program parameter described in the reread information table as a signal extraction parameter of the DEMUX 12 at a step S42 and executes channel changing at a step S43, so that the changed program can be reproduced on a monitor 4 with no hindrance.

Thus, the digital broadcast receiving system according to the embodiment 4 can perform receiving in program change with no hindrance through a receiver of a relatively simple structure, similarly to the embodiment 1.

Embodiment 5

An embodiment 5 of the present invention is based on previous recognition of an end time of a current program from an EPG (electronic program guide).

Figure 7:
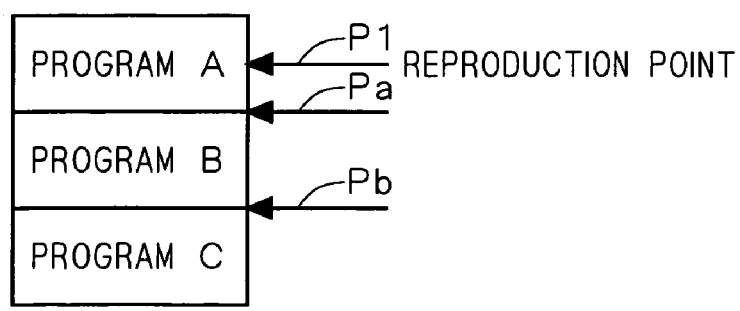
FIG. 7 is an explanatory diagram showing a program change detection principle according to an embodiment 5 of the present invention.

FIG. 7 is an explanatory diagram showing a program change detection principle of the embodiment 5. When programs A, B and C are changed in this order as shown in FIG. 7, a program change point Pa for changing the program A to the program B and a program change point Pb for changing the program B to the program C are previously recognized from the EPG.

Program change timing can be recognized by comparing a current reproduction point P1 with the program change point Pa or the program change point Pb. This comparison can be relatively readily implemented.

Figure 8:
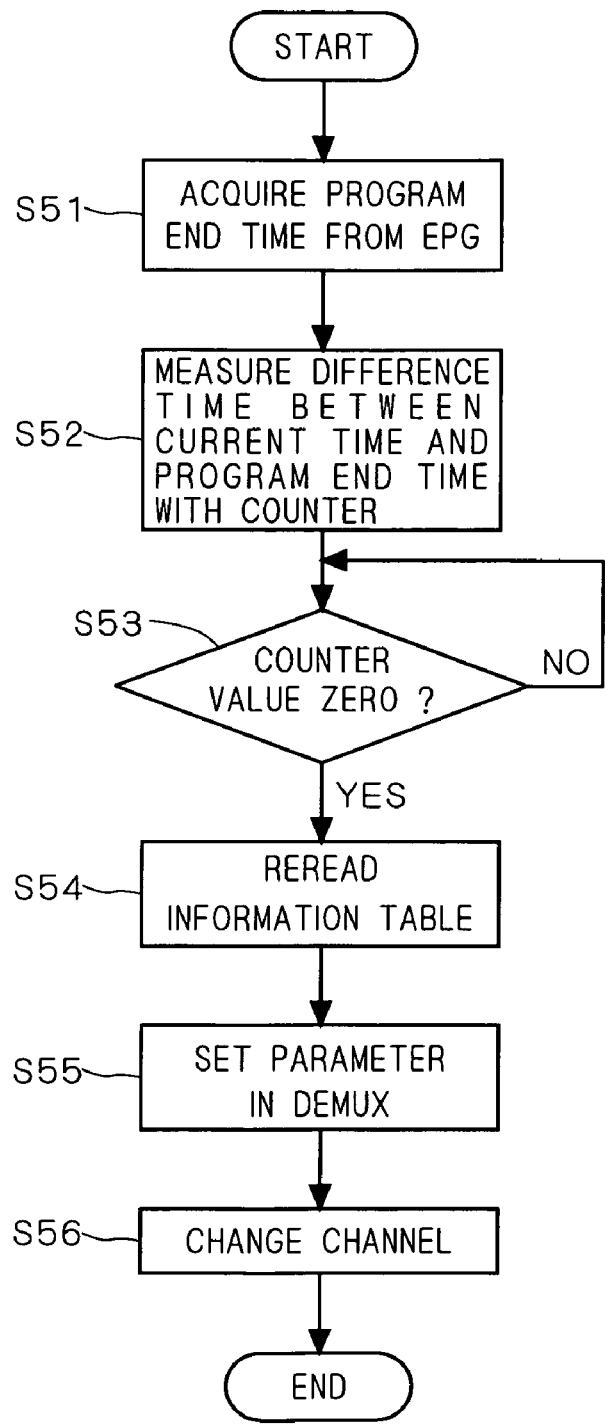
FIG. 8 is a flow chart showing a program change detecting operation in a digital broadcast receiving system according to the embodiment 5 of the present invention.

FIG. 8 is a flow chart showing a program change detecting operation according to a digital broadcast receiving system according to the embodiment 5 of the present invention. This operation is performed mainly on a DEMUX 12 under control of a controller 13, similarly to the embodiment 1. The system structure of the embodiment 5 is similar to that of the embodiment 1.

At a step S51, an end time of a currently reproduced program is previously acquired from the EPG at a step S51. The difference time between the current time and the program end time acquired at the step S51 is measured at a step S52, for initializing a count value of a difference time counter with the aforementioned difference time. Thereafter the count value of the difference time counter is counted down at predetermined time intervals.

The step S53 is repeated until the count value of the difference time counter reaches zero, so that the process first shifts to a step S54 when the count value reaches zero at the step S53.

The changed program can be reproduced on a monitor 4 with no hindrance by rereading an information table at a step S54, setting a program parameter of the reread information table as a signal extraction parameter of the DEMUX 12 at a step S55 and executing channel changing at a step S56.

Thus, the digital broadcast receiving system according to the embodiment 5 can perform receiving in program change with no hindrance through a receiver of a relatively simple structure, similarly to the embodiment 1.

Embodiment 6

Figure 9:
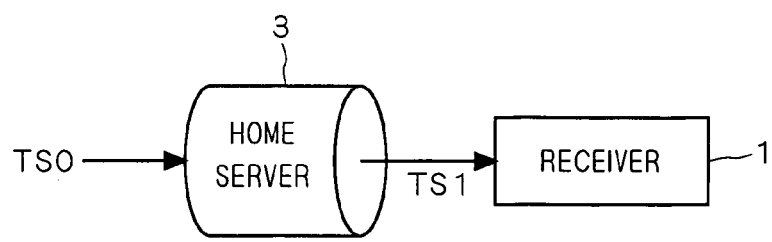
FIG. 9 is a block diagram showing the structure of a digital broadcast receiving system according to an embodiment 6 of the present invention.

FIG. 9 is a block diagram showing the structure of a digital broadcast receiving system according to an embodiment 6 of the present invention. As shown in FIG. 9, an externally received transport stream TS0 (externally received digital broadcast signal) is stored and manipulated in a home server 3 serving as a recording/reproducing part, and thereafter supplied to a receiver 1 as a reproduced transport stream TS1 (digital broadcast signal for reproduction).

Figure 23:
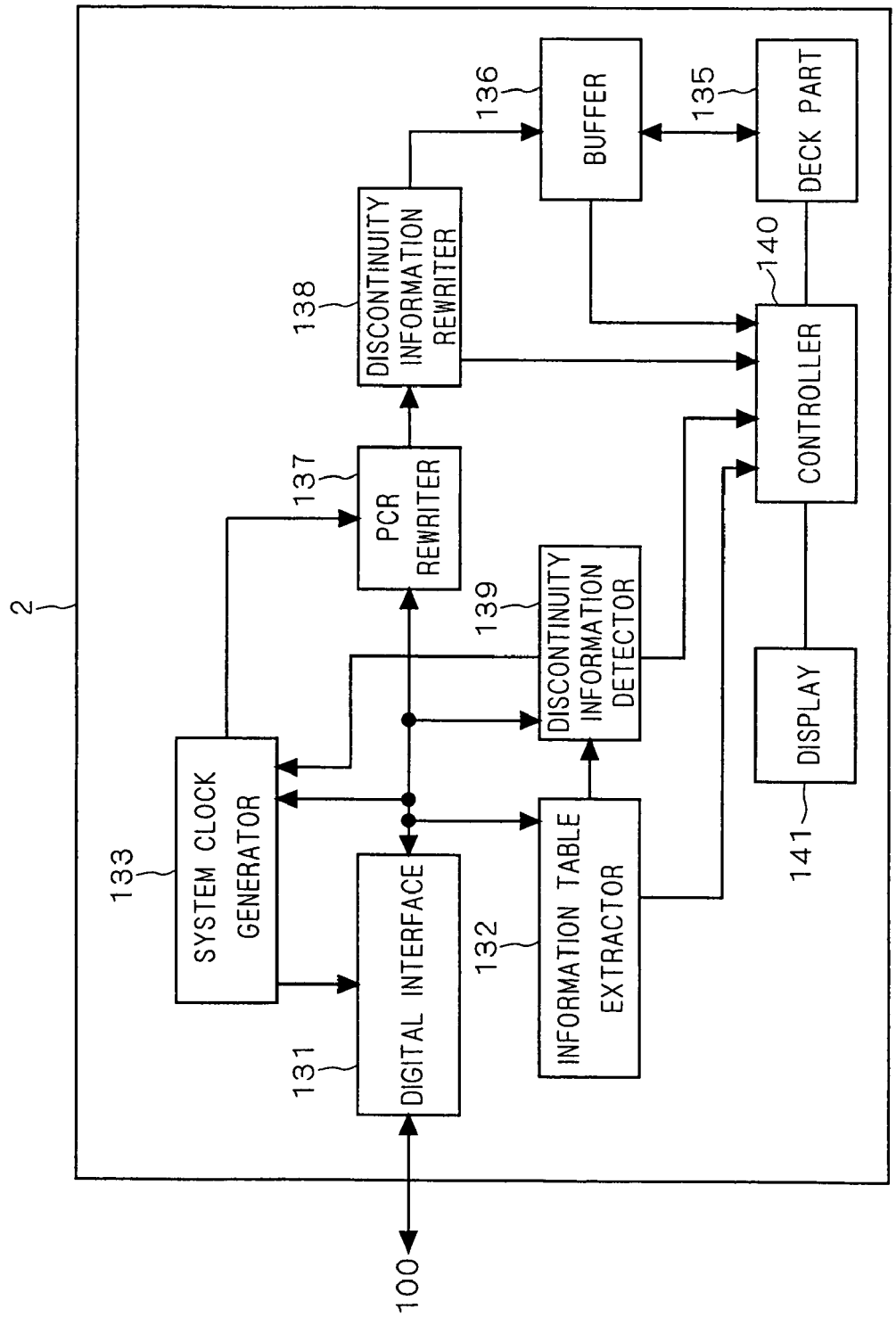
FIG. 23 is a block diagram showing the structure of a recording/reproducing apparatus of the conventional digital broadcast receiving system.

While the receiver 1 of each of the digital broadcast receiving systems according to the embodiments 1 to 5 may directly receive a transport stream from outside without manipulating the same or may receive a reproduced transport stream from a home server, embodiments 6 to 10 of the present invention presuppose the structure that the receiver 1 receives the transport stream TS1 reproduced from the home server, as shown in FIG. 9. The home server, an element corresponding to the conventional recording/reproducing apparatus 2 shown in FIG. 23, is described as a home server specializing a data preservation function deeply related to the characteristic part of the present invention.

Figure 10:
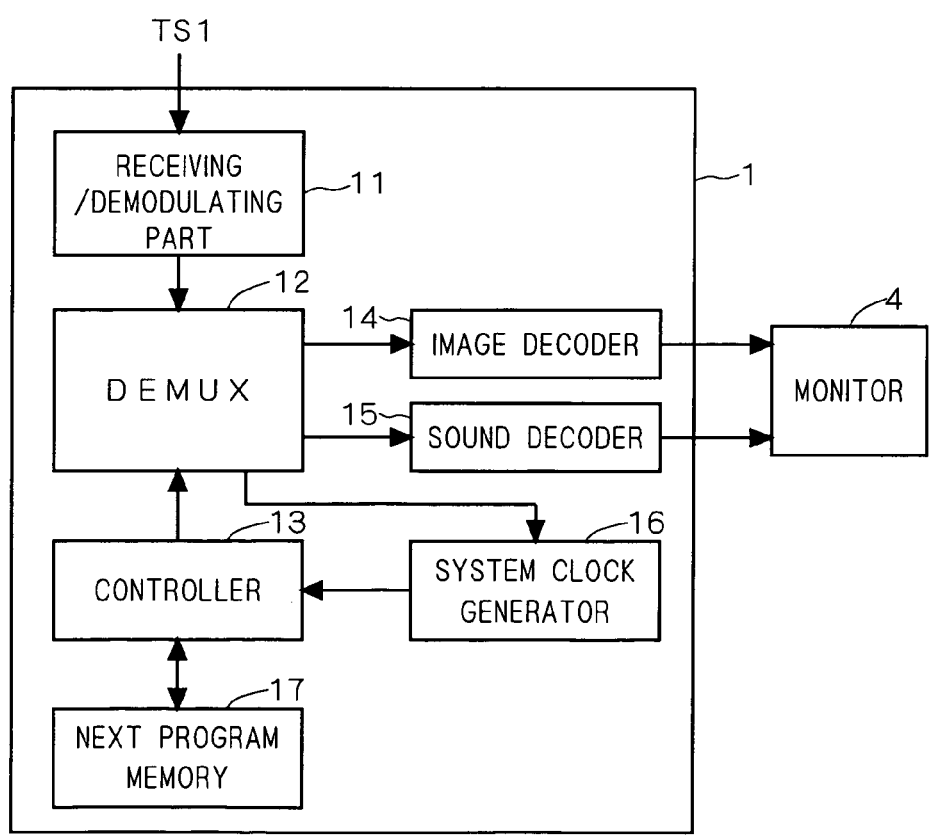
FIG. 10 is a block diagram showing the internal structure of the digital broadcast receiving system according to the embodiment 6 of the present invention.

FIG. 10 is a block diagram showing the structure of the digital broadcast receiving system according to the embodiment 6. As shown in FIG. 10, a next program memory 17 allowing a controller 13 to read/write information is provided. The remaining structure of this embodiment is similar to that of the embodiment 1 shown in FIG. 1, and hence redundant description is omitted.

The digital broadcast receiving system according to the embodiment 6 previously reads an information table of a next program subsequent to a currently reproduced program from the transport stream TS1 stored in the home server 30 and previously stores a next program parameter described in the information table of the next program in the next program memory 17. In this case, the transport stream TS1 may simply include the information table of the next program, and it is conceivable to read the transport stream TS1 on the beginning part of the next program, for example.

The digital broadcast receiving system according to the embodiment 6 previously recognizes an end point of the program from an EPG and rereads the next program parameter from the next program memory 17 when reaching a program change time similarly to the embodiment 5, for setting this parameter as a signal extraction parameter of a demultiplexer and decoding the stream.

The next program parameter is previously written in the next program memory 17, whereby the system according to the embodiment 6 may not monitor the information table.

The signal extraction parameter of the demultiplexer may be set only when reaching the program change time, whereby a load on the system can be reduced.

Figure 11:
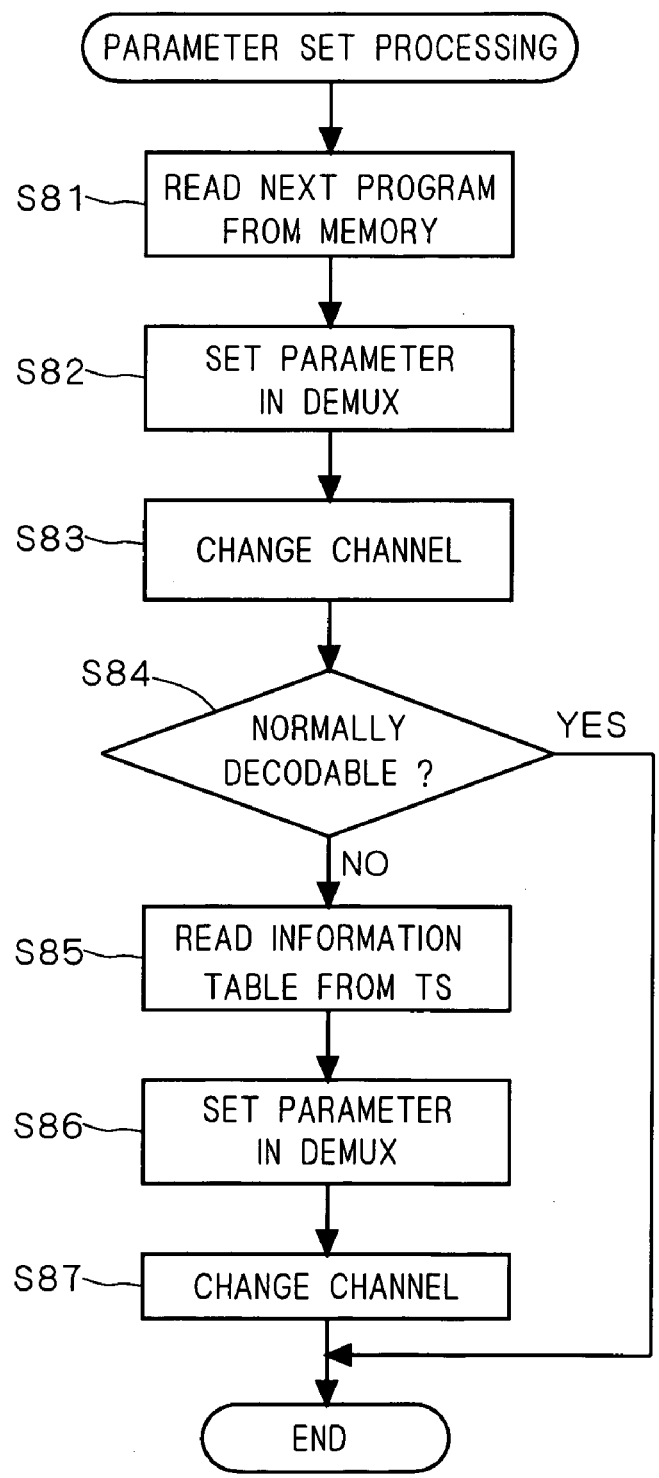
FIG. 11 is a flow chart showing a parameter set processing operation after program change in the digital broadcast receiving system according to the embodiment 6 of the present invention.

FIG. 11 is a flow chart showing a parameter set processing operation after program change by the digital broadcast receiving system according to the embodiment 6 of the present invention. This operation is performed mainly on a DEMUX 12 under control of the controller 13, similarly to the embodiment 1. Program change detection is performed similarly to the processing according to the embodiment 5 shown in the steps S51 to S53 of FIG. 8.

The parameter set processing is started when detecting a program end time through processing similar to that at the steps S51 to S53 of FIG. 8.

The next program parameter corresponding to the changed program previously stored in the next program memory 17 is read from the next program memory 17 at a step S81, and the read next program parameter is set as a signal extraction parameter of the DEMUX 12 at a step S82.

Channel changing is executed at a step S83 for making an image decoder 14 or a sound decoder 15 start decoding a next program. Whether or not it is normally decodable is checked at a step S84.

The processing is ended when normally decodable (YES at the step S84). When not normally decodable (NO at the step S84), an information table is read from a packet stream based on the transport stream TS1 currently flowing from the home server 3 at a step S85, a program parameter described in the read information table is set as the signal extraction parameter of the DEMUX 12 at a step S86, channel changing is executed at a step S87 and thereafter the processing is ended.

The controller 13 detects error notification from the image decoder 14 or the sound decoder 15 as described with reference to the embodiment 4, for determining whether or not it is normally decodable at the step S84.

Thus, the digital broadcast receiving system according to the embodiment 6 can perform receiving in program change with no hindrance through a receiver of a relatively simple structure.

Embodiment 7

A digital broadcast receiving system according to an embodiment 7 of the present invention adds a discontinuity flag (corresponding to the discontinuity information of the prior art) to transport stream data when stopping recording a program and rewrites a CRC value of a transport stream header with reflection of change caused by setting the discontinuity flag thereby detecting program change with a criterion of presence/absence of the discontinuity flag, for newly reading an information table from a transport stream subsequently input in a receiver.

Figure 12:
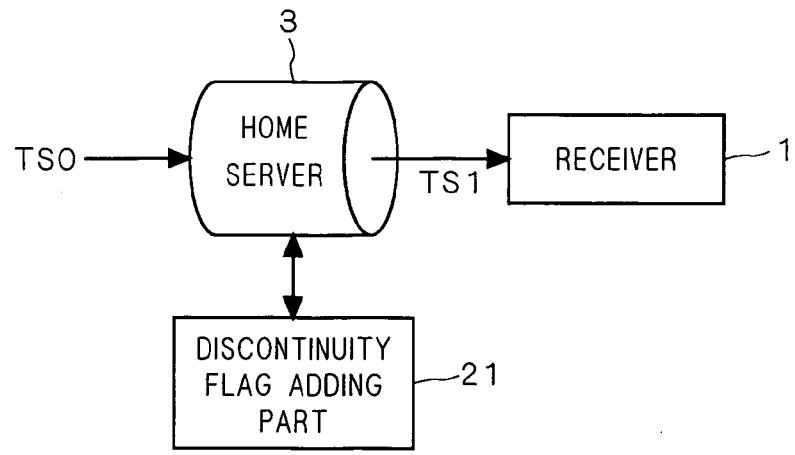
FIG. 12 is an explanatory diagram for illustrating a discontinuity flag adding operation in a digital broadcast receiving system according to an embodiment 7 of the present invention.

FIG. 12 is an explanatory diagram for illustrating a discontinuity flag adding operation by the digital broadcast receiving system according to the embodiment 7. As shown in FIG. 12, the home server 3 recording a transport stream TS0 adds a discontinuity flag by a discontinuity flag adding part 21 when stopping recording the transport stream TS0 and records the transport stream TS0 having the added discontinuity flag as a transport stream TS1.

Therefore, it follows that a receiver 1 receives the transport stream TS1 to which the discontinuity flag is added when the home server 3 stops recording, and hence discontinuity interruption based on discontinuity flag detection takes place in the receiver 1 at the turn of the program. Program change can be detected by this interruption. The discontinuity interruption can be readily caused by setting a DEMUX 12 to cause interruption when detecting the discontinuity flag. The discontinuity flag can be relatively readily detected from the transport stream TS1.

Figure 13:
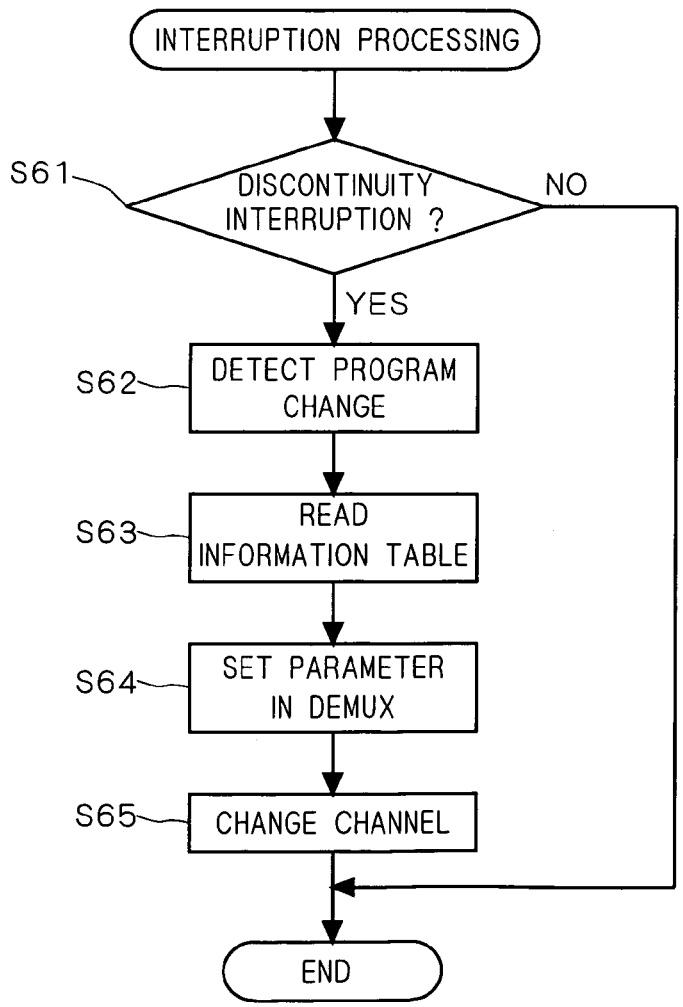
FIG. 13 is a flow chart showing a program change detecting operation in the digital broadcast receiving system according to the embodiment 7 of the present invention.

FIG. 13 is a flow chart showing a program change detecting operation by the digital broadcast receiving system according to the embodiment 7 of the present invention. This operation is performed mainly on the DEMUX 12 under control of a controller 13, similarly to the embodiment 1. The system structure of the embodiment 7 is similar to that of the embodiment 1 (provided with the home server 3) except the presence of the discontinuity flag adding part 21.

As shown in FIG. 13, the program change detecting operation according to the embodiment 7 starts when receiving interruption. First, whether or not this is discontinuity (flag) interruption is checked at a step S61 for ending the processing as such when this is not discontinuity interruption (NO at the step S61). The controller 13 can readily determine whether or not this is discontinuity interruption from the contents of a register indicating the interruption contents.

When this is discontinuity interruption (YES at the step S61), on the other hand, it is regarded that program change is detected at a step S62, an information table is read at a step S63, a program parameter described in the read information table is set as a signal extraction parameter of the DEMUX 12 at a step S64 and channel changing is executed at a step S65, so that the changed program can be reproduced on a monitor 4 with no hindrance.

Embodiment 8

A digital broadcast receiving system according to an embodiment 8 of the present invention determines whether or not a home server 3 is in a reproducing state, not to rewrite a table until the state changes if the home server 3 is in a reproducing state while rewriting the table to set a discontinuity flag on a transport stream when the home server 3 changes from a reproducing state to a stop state. At this time, original data on the home server 3 is not rewritten. A receiver 1 can instantaneously detect that reproduction is stopped by discontinuity (flag) interruption, and can prepare for newly acquiring an information table of a subsequently input stream.

Figure 14:
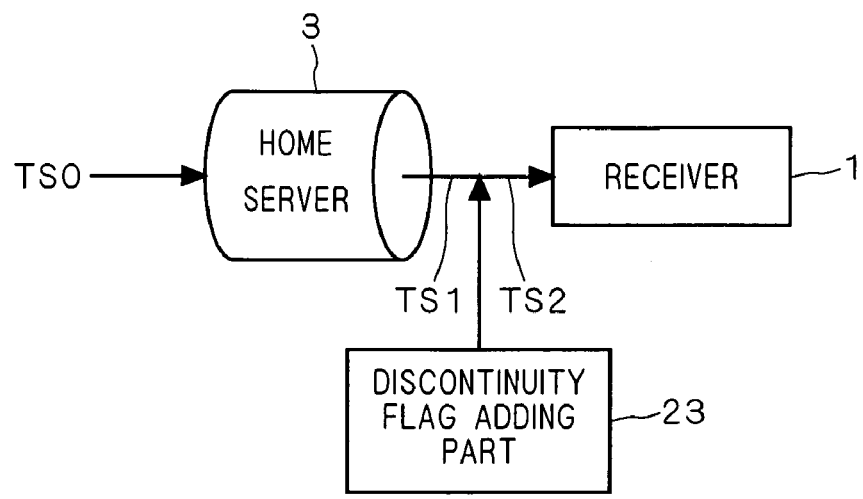
FIG. 14 is an explanatory diagram for illustrating a discontinuity flag adding operation in a digital broadcast receiving system according to an embodiment 8 of the present invention.

FIG. 14 is an explanatory diagram for illustrating a discontinuity flag adding operation by the digital broadcast receiving system according to the embodiment 8. As shown in FIG. 3, the home server 3 outputting a transport stream TS1 in reproduction adds a discontinuity flag by a discontinuity flag adding part 23 when stopping reproduction of the transport stream TS1 and supplies the transport stream TS1 having the added discontinuity flag to the receiver 1 as a transport stream TS2.

Therefore, it follows that the receiver 1 receives the transport stream TS2 to which the discontinuity flag is added when the home server 3 stops reproduction, and hence discontinuity interruption based on discontinuity flag detection takes place in the receiver 1 at the turn of a program. Program change can be detected through this interruption.

While the system according to the embodiment 8 rewrites the table to set the discontinuity flag on the transport stream by the discontinuity flag adding part 23 when the home server 3 changes from the reproducing state to the stop state, detection of program change in continuous reproduction can also be enabled by rewriting the transport stream to set a discontinuity flag also in ending of a single program during reproduction.

The digital broadcast receiving system according to the embodiment 8 performs a program change detecting operation similarly to the embodiment 7 shown in FIG. 13, and hence redundant description is omitted. The system structure of the digital broadcast receiving system according to the embodiment 8 is similar to that of the embodiment 1 (provided with the home server 3) except that the transport stream TS1 is changed to the transport stream TS2 and the presence of the discontinuity flag adding part 21.

Embodiment 9

A digital broadcast receiving system according to an embodiment 9 of the present invention re-affixes a version number (identification code) of an information table when a home server 3 is in a recording state so that program change can be quickly performed with detection by version-up interruption in a system performing reproduction in recorded order. Data on the home server 3 is previously rewritten, a processing time can be reduced in reproduction while a controller 13 may execute program change when receiving the version-up interruption, whereby system resources are not consumed.

Figure 15:
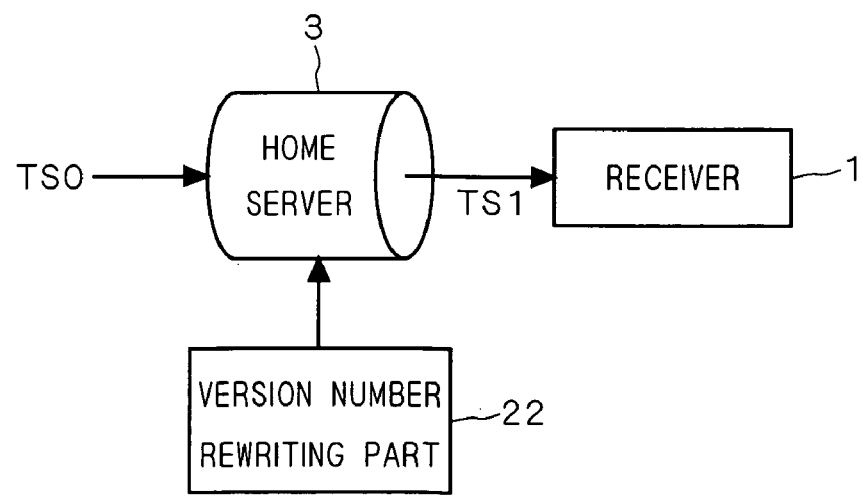
FIG. 15 is an explanatory diagram for illustrating a version number rewriting operation in a digital broadcast receiving system according to an embodiment 9 of the present invention.

FIG. 15 is an explanatory diagram for illustrating a version number rewriting operation in the digital broadcast receiving system according to the embodiment 9.

As shown in FIG. 15, the home server 3 recording a transport stream TS0 rewrites a version number and a CRC value of an information table by a version number rewriting part 22 after recording the transport stream TS0. The version number is set with regularity to increment one by one along order of program reproduction. The home server 3 can identify an interval between programs as an end point of file reproduction. The home server 3 preserves the transport stream TS0 in which the version number and the CRC value of the information table are rewritten as a transport stream TS1.

Therefore, it follows that a receiver 1 receives the transport stream TS1 multiplexed with the information table in which the version number is updated at the turn of the program. When causing version-up interruption based on detection of version number change of the information table on the receiver 1 at the turn of the program, program change can be detected by this version-up interruption. In other words, change of the version number of the information table can be relatively readily detected from the transport stream TS1.

Figure 16:
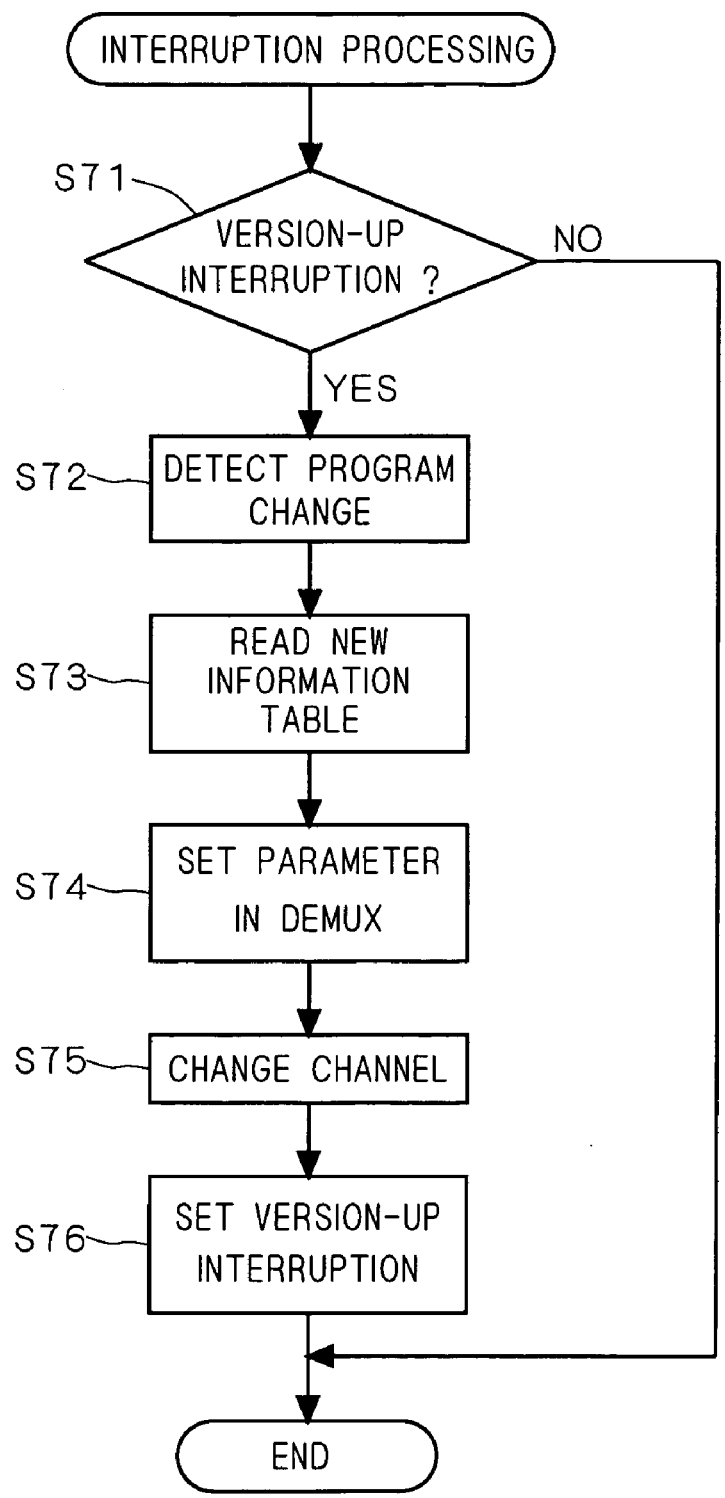
FIG. 16 is a flow chart showing a program change detecting operation in the digital broadcast receiving system according to the embodiment 9 of the present invention.

FIG. 16 is a flow chart showing a program change detecting operation by the digital broadcast receiving system according to the embodiment 9 of the present invention. This operation is performed mainly on a DEMUX 12 under control of a controller 13, similarly to the embodiment 1. The system structure of the embodiment 9 is similar to that of the embodiment 1 (provided with the home server 3) except the presence of the version number rewriting part 22.

As shown in FIG. 16, the embodiment 9 starts the program change detecting operation when receiving interruption. First, whether or not this is version-up interruption is checked at a step S71 for ending the processing as such when this is not version-up interruption (NO at the step S71). The controller 13 can readily determine whether or not this is version-up interruption from the contents of a register indicating the interruption contents.

When this is version-up interruption (YES at the step S71), it is regarded that program change is detected at a step S72, the newest information table is read at a step S73, a program parameter described in the read information table is set as a signal extraction parameter of the DEMUX 12 at a step S74 and channel changing is executed at a step S75, so that a changed program can be reproduced on a monitor 4 with no hindrance.

Thereafter a version number for causing version-up interruption is set at the DEMUX 12 thereby setting version-up interruption and ending the processing. Due to this version-up interruption setting, the DEMUX 12 can cause version-up interruption when recognizing the set version number.

The embodiment 9 detects program change by causing version-up interruption, whereby no checking other than the processing for checking whether or not this is version-up interruption is required and hence the procedure can be simplified.

Embodiment 10

A digital broadcast receiving system according to an embodiment 10 of the present invention increments a version number of an information table one by one on an output stage of a transport stream when reproduction of the transport stream is interrupted. When the stream is reproduced next, the version number of the information table is incremented by 1 and hence a program parameter of a new information table can be set as a signal extraction parameter of a DEMUX 12 by performing processing with version-up interruption similarly to the embodiment 9, whereby program change can be quickly performed.

FIG. 17 is an explanatory diagram for illustrating a version number rewriting operation in the digital broadcast receiving system according to the embodiment 10.

As shown in FIG. 17, a home server 3 reproducing a transport stream TS1 rewrites a version number and a CRC value of an information table by a version number rewriting part 24 when interrupting reproduction for shifting from a reproducing state for the transport stream TS0 to a stop state. The version number is set to increment one by one in order of program reproduction. The home server 3 outputs the transport stream TS1 in which the version number and the CRC value of the information table are rewritten to a receiver 1 as a transport stream TS2.

Therefore, it follows that the receiver 1 receives the transport stream TS2 multiplexed with the information table in which the version number is updated at the turn of a program. When causing version-up interruption based on detection of version number change of the information table on the receiver 1 at the turn of the program, program change can be detected due to this version-up interruption.

Also when reproducing programs of the home server 3 with no special order, the version number rewriting part 24 rewrites the version number to sequentially increment, whereby the receiver 1 can perform a receiving operation including decoding with no hindrance.

The embodiment 10 performs a program change detecting operation similarly to the flow chart of the embodiment 9 shown in FIG. 16. The system structure of the embodiment 10 is similar to that of the embodiment 1 (provided with the home server 3) except the presence of the version number rewriting part 24.

Embodiment 11

A digital broadcast receiving system according to an embodiment 11 of the present invention presupposes that a home server uses and adds current and next flags to an information table or the like so that a current information table corresponding to a current program and a next information table corresponding to a next program are multiplexed on a transport stream TS1 obtained from the home server. In this case, the transport stream TS1 may be directly obtained in a receiver 1 from outside or may be reproduced from the home server.

In the digital broadcast receiving system according to the embodiment 1, the receiver 1 previously reads the next information table so that a program can be instantaneously changed when a current information table having the same contents as read arrives. In this method, program change is more quickly performed not by reading an information table for a next program after arrival of a transport stream of the next program but by previously recognizing a program parameter of the information table for the next program.

Figure 19:
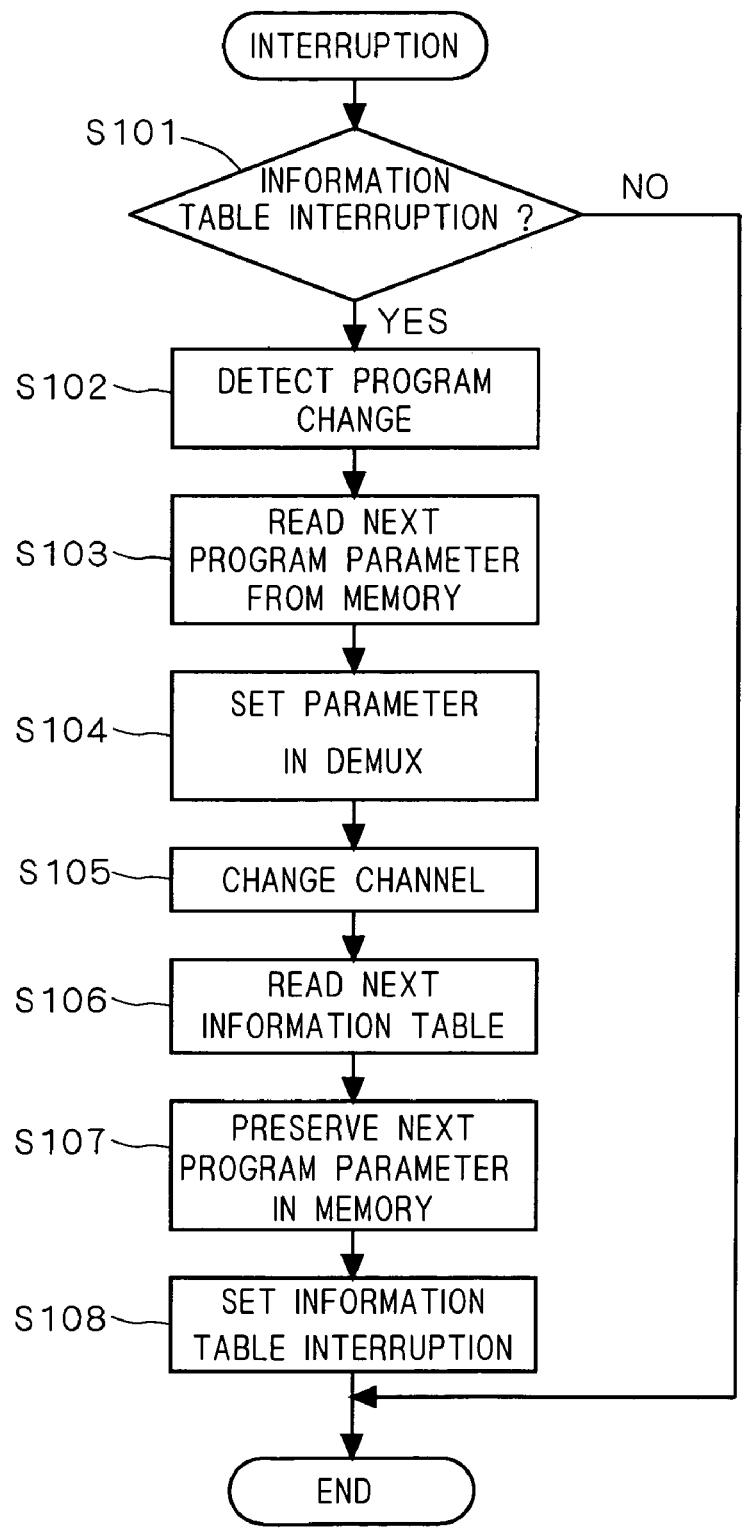
FIG. 19 is a flow chart showing an interruption processing operation in the first program change detecting operation in the digital broadcast receiving system according to the embodiment 11 of the present invention.

FIGS. 18 and 19 are flow charts showing a first program change detecting operation by the digital broadcast receiving system according to the embodiment 11 of the present invention. This operation is performed mainly on a DEMUX 12 under control of a controller 13, similarly to the embodiment 1. The system structure of the embodiment 11 is similar to that of the embodiment 1 except that the receiver 1 stores a next information table memory (memory capable of reading/writing information from/in the controller 13 similarly to the next program memory 17 shown in FIG. 19).

Initialization is now described with reference to FIG. 18. First, the current information table is read at a step S91, a program parameter described in the read information table is set as a signal extraction parameter of the DEMUX 12 at a step S92, and channel changing is executed at a step S93.

The next information table is read at a step S94, and a program parameter described in the next information table at the step S94 is preserved in the next information table memory as a next program parameter at a step S95. The next program parameter is temporarily set at the step S95.

Thereafter the DEMUX 12 is so set as to cause interruption (information table interruption) when the contents of the current information table are changed to those of the next information table at a step S96.

When the initialization is ended, an interruption operation shown in FIG. 19 is enabled. In other words, the operation shown in FIG. 19 is started when receiving interruption.

First, whether or not it is information table interruption is checked at a step S101 for ending the processing when this is not information table interruption (NO at the step S101) while shifting to a step S102 when it is information table interruption (YES at the step S101).

Program change is detected at the step S102, and a next program parameter is read from the next information table memory at a step S103. The next program parameter is set as a signal extraction parameter of the DEMUX 12 at a step S104, and channel changing is executed at a step S105. The next program parameter is really set through the steps S103 to S105.

The memory read operation at the step S103 is performed at a speed considerably higher than that for the information table read operation from the transport stream TS1, whereby efficiency of program change can be improved.

The next information table is read at a step S106, and a program parameter described in the read next information table is preserved in the next information table as a new next program parameter at a step S106.

The DEMUX 12 is so set as to cause information table interruption when the contents of the current information table change to those of a new next information table at a step S108, for ending the processing.

Figure 20:
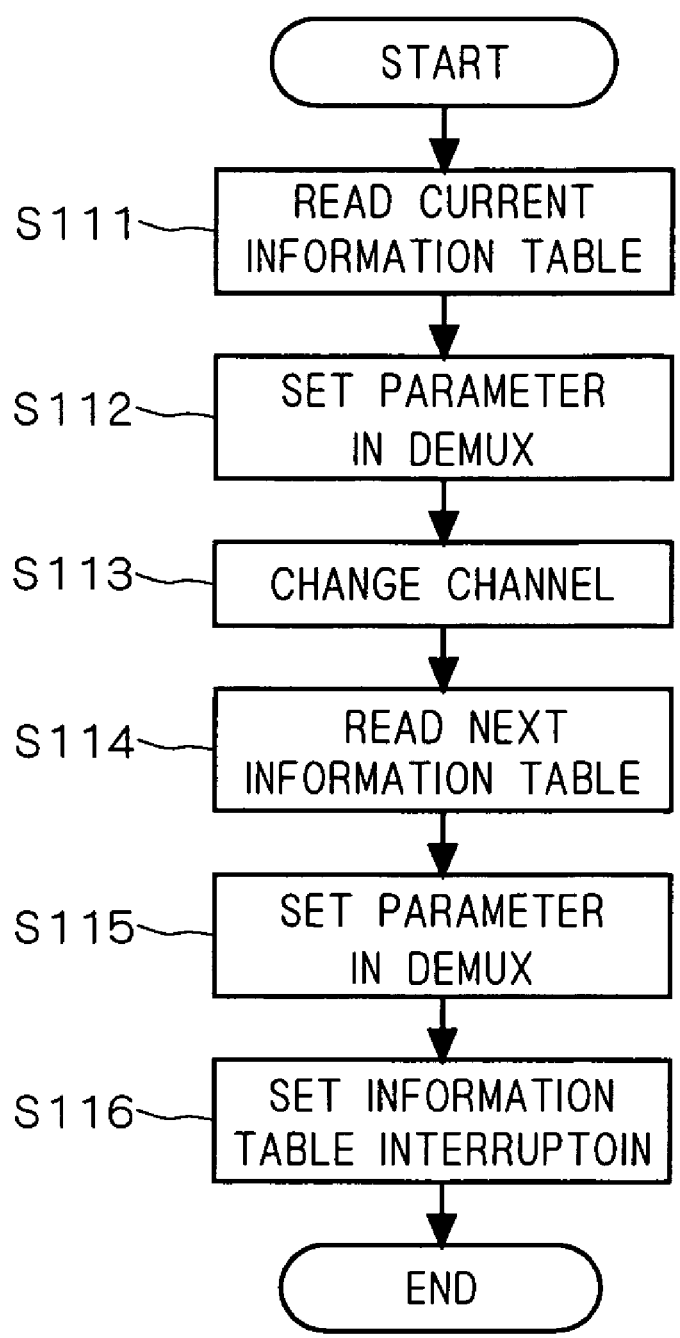
FIG. 20 is a flow chart showing an initial operation of a second program change detecting operation in the digital broadcast receiving system according to the embodiment 11 of the present invention.
Figure 21:
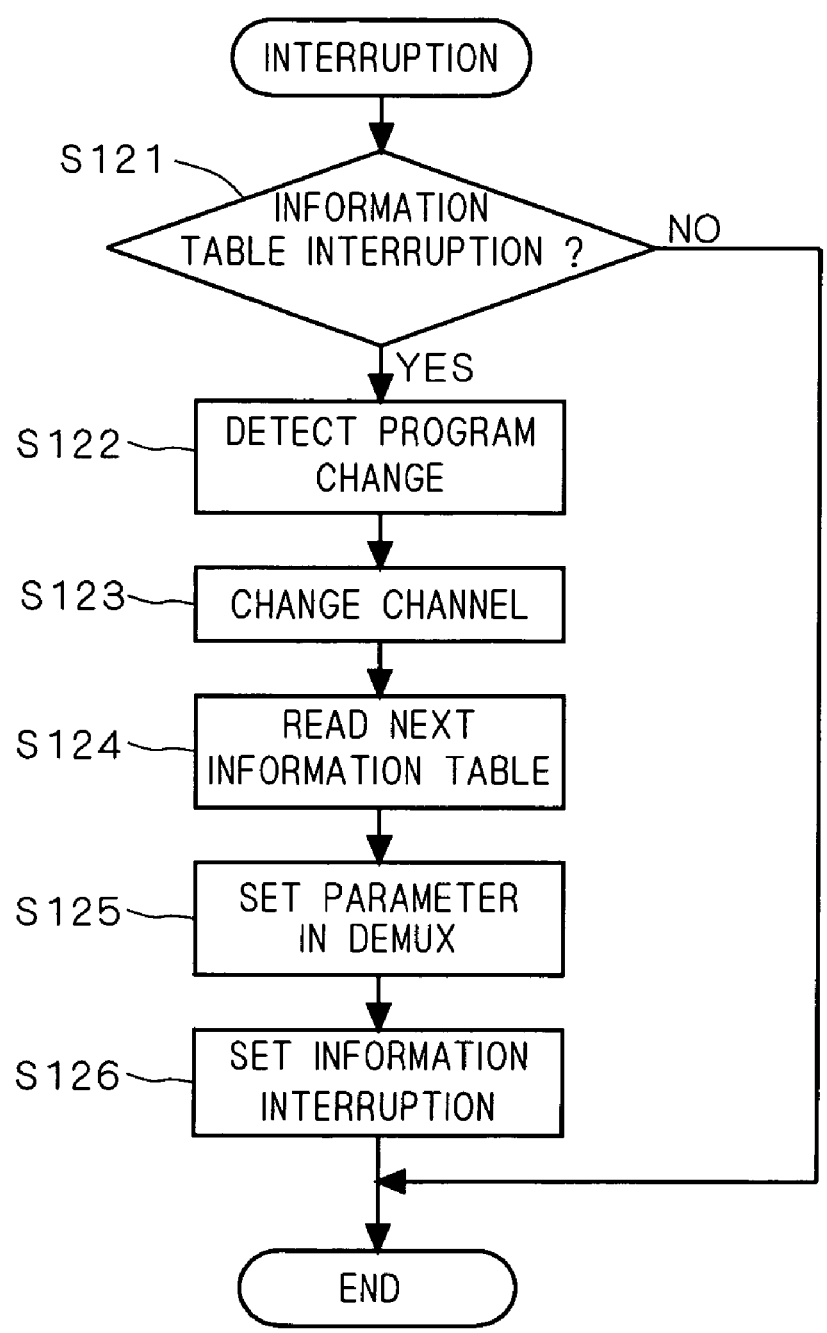
FIG. 21 is a flow chart showing an interruption processing operation in the second program change detecting operation in the digital broadcast receiving system according to the embodiment 11 of the present invention.
Figure 22:
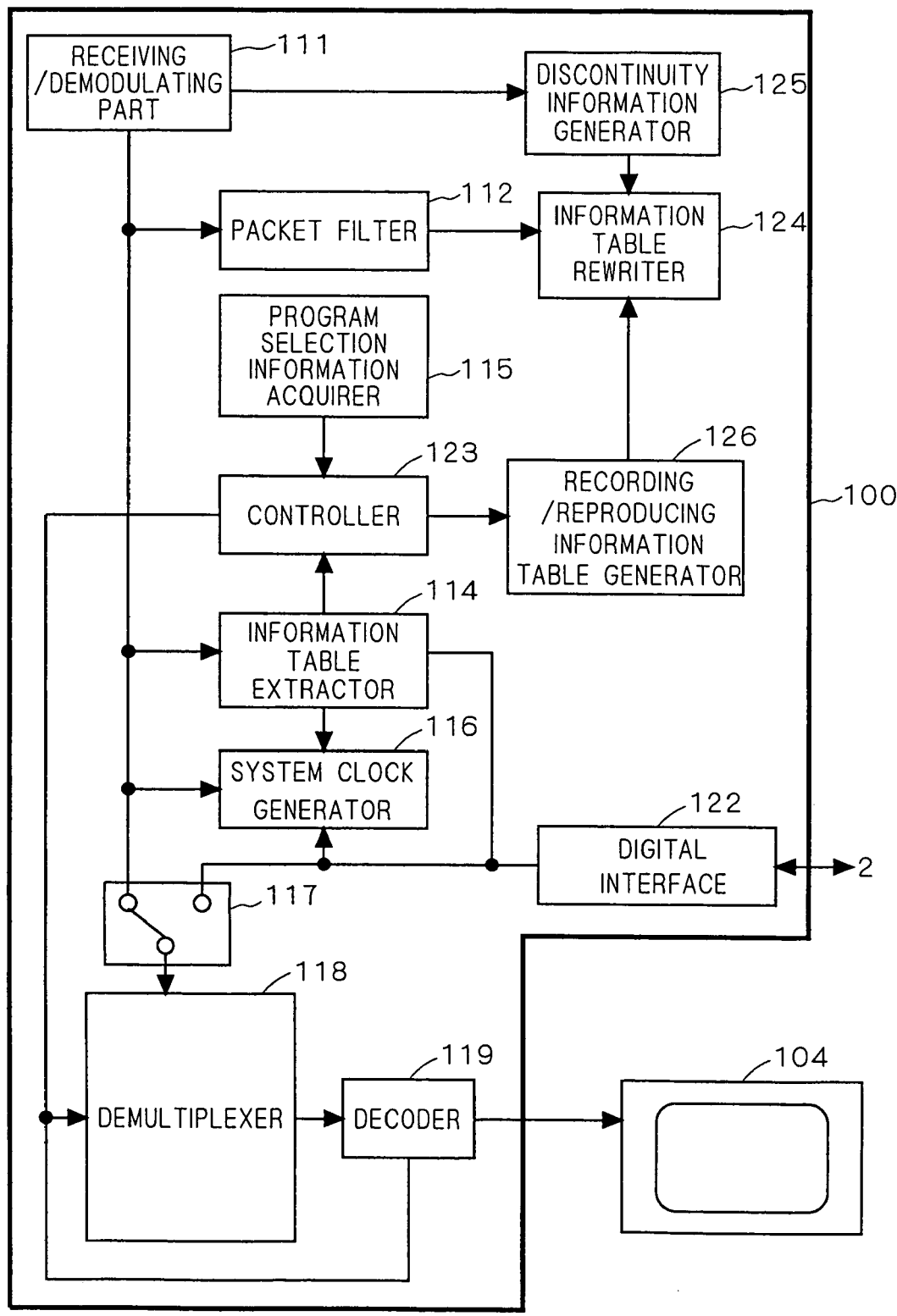
FIG. 22 is a block diagram showing the structure of a receiver of a conventional digital broadcast receiving system.

FIGS. 20 and 21 are flow charts showing a second program change detecting operation by the digital broadcast receiving system according to the embodiment 11 of the present invention. The system structure of this embodiment is similar to that of the embodiment 1.

Initialization is now described with reference to FIG. 20. First, the current information table is read at a step S111, a program parameter described in the read current information table is set as a signal extraction parameter of the DEMUX 12 at a step S112, and channel changing is executed at a step S113.

The next information table is read at a step S114, and a program parameter described in the read next information table is set as a signal extraction parameter at a step S115.

The DEMUX 12 is so set as to cause interruption (information table interruption) when the contents of the current information table are changed to those of the next information table at a step S118.

When the initialization is ended, an interruption operation shown in FIG. 21 is enabled. In other words, the operation shown in FIG. 21 is started when receiving interruption. No channel changing is executed after the step S115 in the initialization, and hence the signal extraction parameter set at the step S115 is not validated but the signal extraction parameter set at the step S112 is still valid. In other words, the processing at the step S115 is temporary setting of the signal extraction parameter.

Referring to FIG. 21, whether or not it is information table interruption is checked at a step S121, for ending the processing if this is not information table interruption (NO at the step S121) while shifting to a step S122 if this is information table interruption (YES at the step S121).

Program change is detected at a step S122, and channel changing is executed at a step S123. The signal extraction parameter set at the step S115 in the initialization shown in FIG. 20 is first validated at this point of time. In other words, the signal extraction parameter is really set at the step S123.

The next information table is read at a step S124, and a program parameter described in the next information table is set as a signal extraction parameter at a step S125. The DEMUX 12 is so set as to cause information table interruption when the contents of the current information table are changed to those of a next information table at a step S126, for ending the processing.

In the second program change detecting operation, program change is ended by simply executing channel changing, whereby the efficiency of program change can be remarkably improved also as compared with the first program change detecting operation.

While the invention has been shown and described in detail, the foregoing description is in all aspects illustrative and not restrictive. It is therefore understood that numerous modifications and variations can be devised without departing from the scope of the invention.

What is claimed is:

1. A digital broadcast receiving system having a receiver receiving a digital broadcast signal including an information table describing a program parameter forming a program, said receiver comprising:

a parameter set portion configured to set said program parameter described in said information table included in said digital broadcast signal as a signal extraction parameter; and a signal extraction portion configured to extract a program signal from said digital broadcast signal on the basis of said signal extraction parameter, said parameter set portion configured to detect content change of said information table on the basis of a predetermined criterion and to set said program parameter, described in said information table, that has changed as said signal extraction parameter upon detecting said content change, wherein said information table further describes a program clock reference (PCR), and said parameter set portion is configured to monitor a discontinuity of said PCR, while said predetermined criterion includes presence/absence of discontinuity of said PCR.

2. A digital broadcast receiving system having a receiver receiving a digital broadcast signal including an information table describing a program parameter forming a program, said receiver comprising:

a parameter set portion configured to set said program parameter described in said information table included in said digital broadcast signal as a signal extraction parameter; and a signal extraction portion configured to extract a program signal from said digital broadcast signal on the basis of said signal extraction parameter, said parameter set portion configured to detect content change of said information table on the basis of a predetermined criterion and to set said program parameter, described in said information table, that has changed as said signal extraction parameter upon detecting said content change, wherein said information table further describes a program clock reference (PCR), and said parameter set portion is configured to monitor the received state of said PCR, while said predetermined criterion includes whether or not said PCR is unreceivable for a predetermined time.

3. A digital broadcast receiving system having a receiver receiving a digital broadcast signal including an information table describing a program parameter forming a program, said receiver comprising:

a parameter set portion configured to set said program parameter described in said information table included in said digital broadcast signal as a signal extraction parameter; and a signal extraction portion configured to extract a program signal from said digital broadcast signal on the basis of said signal extraction parameter, said parameter set portion configured to detect content change of said information table on the basis of a predetermined criterion and to set said program parameter, described in said information table, that has changed as said signal extraction parameter upon detecting said content change, wherein said receiver further comprises:

a decoding portion configured to decode said program signal, and said parameter set portion is configured to monitor a result of decoding by said decoding portion, while said predetermined criterion includes presence/absence of error occurrence in said result of decoding.

4. A digital broadcast receiving system having a receiver receiving a digital broadcast signal including an information table describing a program parameter forming a program, said receiver comprising:

a parameter set portion configured to set said program parameter described in said information table included in said digital broadcast signal as a signal extraction parameter; and a signal extraction portion configured to extract a program signal from said digital broadcast signal on the basis of said signal extraction parameter, said parameter set portion configured to detect content change of said information table on the basis of a predetermined criterion and to set said program parameter, described in said information table, that has changed as said signal extraction parameter upon detecting said content change, wherein said digital broadcast signal includes an EPG (electric program guide) describing a schedule for a broadcasted program, and said parameter set portion is configured to previously recognize an end time of a currently received program from said EPG, while said predetermined criterion includes whether or not reaching said end time of said program.

5. The digital broadcast receiving system according to claim 4, further comprising:

a recording/reproducing portion having a recording/reproducing part configured to receive an externally received digital broadcast signal from outside for recording said externally received digital broadcast signal while outputting recorded said signal as a digital broadcast signal for reproduction, wherein said digital broadcast signal includes said digital broadcast signal for reproduction, said receiver further comprises a storage portion, and said parameter set portion is configured to extract a next program information table servicing as an information table for a next program subsequent to a current program currently received by said receiver from said digital broadcast signal for reproduction recorded in said recording/reproducing part, previously preserves a program parameter described in said next program information table as a next program parameter, and reads said next program parameter from said storage portion to set said next program parameter as said signal extraction parameter when the contents of said information table change.

6. A digital broadcast receiving system having a receiver receiving a digital broadcast signal including an information table describing a program parameter forming a program, said receiver comprising:

a parameter set portion configured to set said program parameter described in said information table included in said digital broadcast signal as a signal extraction parameter; and a signal extraction portion configured to extract a program signal from said digital broadcast signal on the basis of said signal extraction parameter, said parameter set portion configured to detect content change of said information table on the basis of a predetermined criterion and to set said program parameter, described in said information table, that has changed as said signal extraction parameter upon detecting said content change;

a recording/reproducing portion having a recording/reproducing part configured to receive an externally received digital broadcast signal from outside for recording said externally received digital broadcast signal while outputting recorded said signal as a digital broadcast signal for reproduction, wherein said digital broadcast signal includes said digital broadcast signal for reproduction, said recording/reproducing portion further comprises:

a discontinuity flag adding part for adding a discontinuity flag to said externally received digital broadcast signal when said recording/reproducing part stops recording said externally received digital broadcast signal and making said recording/reproducing part record said externally received digital broadcast signal to which said discontinuity flag is added as said digital broadcast signal for reproduction, and said parameter set portion is configured to monitor said discontinuity flag in said digital broadcast signal for reproduction, while said predetermined criterion includes presence/absence of said discontinuity flag.

7. A digital broadcast receiving system having a receiver receiving a digital broadcast signal including an information table describing a program parameter forming a program, said receiver comprising:

a parameter set portion configured to set said program parameter described in said information table included in said digital broadcast signal as a signal extraction parameter; and a signal extraction portion configured to extract a program signal from said digital broadcast signal on the basis of said signal extraction parameter, said parameter set portion configured to detect content change of said information table on the basis of a predetermined criterion and to set said program parameter, described in said information table, that has changed as said signal extraction parameter upon detecting said content change;

a recording/reproducing portion having a recording/reproducing part configured to receive an externally received digital broadcast signal from outside for recording said externally received digital broadcast signal while outputting recorded said signal as a digital broadcast signal for reproduction, wherein said digital broadcast signal includes said digital broadcast signal for reproduction, said recording/reproducing portion further comprises:

a discontinuity flag adding part adding a discontinuity flag to said digital broadcast signal for reproduction when said recording/reproducing part shifts from a reproducing state for said digital broadcast signal for reproduction to a stop state, and said parameter set portion is configured to monitor said discontinuity flag in said digital broadcast signal for reproduction, while said predetermined criterion includes presence/absence of said discontinuity flag.

8. A digital broadcast receiving system having a receiver receiving a digital broadcast signal including an information table describing a program parameter forming a program, said receiver comprising:

a parameter set portion configured to set said program parameter described in said information table included in said digital broadcast signal as a signal extraction parameter; and a signal extraction portion configured to extract a program signal from said digital broadcast signal on the basis of said signal extraction parameter, said parameter set portion configured to detect content change of said information table on the basis of a predetermined criterion and to set said program parameter, described in said information table, that has changed as said signal extraction parameter upon detecting said content change;

a recording/reproducing portion having a recording/reproducing part configured to receive an externally received digital broadcast signal from outside for recording said externally received digital broadcast signal while outputting recorded said signal as a digital broadcast signal for reproduction, wherein said digital broadcast signal includes said digital broadcast signal for reproduction, said recording/reproducing portion further comprises:

an identification code adding portion configured to add an identification code identifiable in a program unit to said information table in said externally received digital broadcast signal when said recording/reproducing part records said externally received digital signal and make said recording/reproducing portion record said externally received digital broadcast signal to which said identification code is added as said digital broadcast signal for reproduction, and said parameter set portion is configured to monitor said identification code added to said information table in said digital broadcast signal for reproduction, while said predetermined criterion includes presence/absence of change of said identification code.

9. A digital broadcast receiving system having a receiver receiving a digital broadcast signal including an information table describing a program parameter forming a program, said receiver comprising:

a parameter set portion configured to set said program parameter described in said information table included in said digital broadcast signal as a signal extraction parameter; and a signal extraction portion configured to extract a program signal from said digital broadcast signal on the basis of said signal extraction parameter, said parameter set portion configured to detect content change of said information table on the basis of a predetermined criterion and to set said program parameter, described in said information table, that has changed as said signal extraction parameter upon detecting said content change;

a recording/reproducing portion having a recording/reproducing part configured to receive an externally received digital broadcast signal from outside for recording said externally received digital broadcast signal while outputting recorded said signal as a digital broadcast signal for reproduction, wherein said digital broadcast signal includes said digital broadcast signal for reproduction, said recording/reproducing portion further comprises:

an identification code adding portion configured to add a new identification code to an information table in said digital broadcast signal for reproduction every time said recording/reproducing part shifts from a reproducing state for said digital broadcast signal for reproduction to a stop state, and said parameter set portion is configured to monitor said identification code added to said information table in said digital broadcast signal for reproduction, while said predetermined criterion includes presence/absence of change of said identification code.

10. A digital broadcast receiving system having a receiver receiving a digital broadcast signal including an information table describing a program parameter forming a program, said receiver comprising:
- a parameter set portion configured to set said program parameter described in said information table included in said digital broadcast signal as a signal extraction parameter; and
- a signal extraction portion configured to extract a program signal from said digital broadcast signal on the basis of said signal extraction parameter,
- said parameter set portion configured to detect content change of said information table on the basis of a predetermined criterion and to set said program parameter, described in said information table, that has changed as said signal extraction parameter upon detecting said content change, wherein
- said information table includes:
- a current program information table corresponding to a currently broadcasted program, and
- a next program information table corresponding to a program broadcasted next, and wherein,
- said parameter set portion
- previously performs temporary set processing extracting said next program information table from said digital broadcast signal and temporarily setting a program parameter described in said next program information table as a next program parameter,
- monitors the contents of said current program information table while said predetermined criterion includes whether or not the contents of said current program information table change to the contents of said next program information table, and
- performs real set processing setting temporarily set said next program parameter as said signal extraction parameter when the contents of said information table change.

11. The digital broadcast signal receiving system according to claim 10, wherein
- said receiver includes a storage portion,
- said temporary set processing includes processing of making said storage portion store said next program parameter, and
- said read set processing includes processing of reading said next program parameter from said storage portion and setting said next program parameter as a signal extraction parameter.

12. The digital broadcast signal receiving system according to claim 10, wherein
- said signal extraction portion is configured to extract a program signal from said digital broadcast signal on the basis of valid said signal extraction parameter,
- said temporary setting includes processing of temporarily setting said next program parameter without validating the same as said signal extraction parameter, and
- said real set processing includes processing of validating said signal extraction parameter.

\* \* \* \* \*